US007653947B2

(12) United States Patent
Hatano

(10) Patent No.: US 7,653,947 B2
(45) Date of Patent: Jan. 26, 2010

(54) IMAGE FORMING SYSTEM, IMAGE FORMING APPARATUS, CONTROL METHOD THEREFOR AND PROGRAM IMPLEMENTING THE CONTROL METHOD

(75) Inventor: Manami Hatano, Kanagawa (JP)

(73) Assignee: Canon Kabushiki Kaisha (JP)

( * ) Notice: Subject to any disclaimer, the term of this patent is extended or adjusted under 35 U.S.C. 154(b) by 825 days.

(21) Appl. No.: 10/994,939

(22) Filed: Nov. 22, 2004

(65) Prior Publication Data

US 2005/0111867 A1 May 26, 2005

(30) Foreign Application Priority Data

Nov. 21, 2003 (JP) ............................ 2003-392379

(51) Int. Cl.
*G06F 7/04* (2006.01)
*H04L 9/00* (2006.01)
*H04N 7/167* (2006.01)

(52) U.S. Cl. .......................... 726/32; 713/178; 380/51; 380/203

(58) Field of Classification Search ................. 713/189, 713/178; 726/32; 380/51, 203
See application file for complete search history.

(56) References Cited

U.S. PATENT DOCUMENTS

| | | | | |
|---|---|---|---|---|
| 6,192,165 | B1 * | 2/2001 | Irons | 382/306 |
| 6,499,665 | B1 * | 12/2002 | Meunier et al. | 235/487 |
| 6,582,138 | B1 * | 6/2003 | Meunier et al. | 400/103 |
| 6,952,780 | B2 * | 10/2005 | Olsen et al. | 726/26 |

FOREIGN PATENT DOCUMENTS

| | | | |
|---|---|---|---|
| JP | 10-177552 | A | 6/1998 |
| JP | 10-308868 | A | 11/1998 |
| JP | 2001-242753 | A | 9/2001 |
| JP | 2002-120475 | A | 4/2002 |
| JP | 2002-373066 | A | 12/2002 |
| JP | 2003-32487 | A | 1/2003 |
| JP | 2003-60881 | A | 2/2003 |
| JP | 2003-134327 | A | 5/2003 |

OTHER PUBLICATIONS

Japanese Office Action dated Mar. 17, 2009, issued in corresponding Japanese Patent Application No. 2003-392379. English translation provided.

* cited by examiner

*Primary Examiner*—Nasser G Moazzami
*Assistant Examiner*—Mohammad W Reza
(74) *Attorney, Agent, or Firm*—Rossi, Kimms & McDowell, LLP

(57) ABSTRACT

An image forming system which is capable of enhancing security in an i-copy function. A server apparatus stores document data once having been printed in association with a sheet identifier recorded on a print sheet on which the document data has been printed. An image reader section reads the sheet identifier from the print sheet when a copy command is issued by the user authenticated based on an entered user identifier by a CPU of a MFP. A printer section reads out and prints the document data from the server apparatus. When the sheet identifier has not been read from the print sheet based on the copy command over a predetermined time period, the document data is inhibited from being printed by the printer section.

19 Claims, 37 Drawing Sheets

FIG. 7A

701

| SHEET IDENTIFIER (702) | USER IDENTIFIER (703) | PRINT COMMAND ACCEPTANCE TIME (704) | DOCUMENT DATA IDENTIFIER (705) | ... |
|---|---|---|---|---|

FIG. 7B

710

| SHEET IDENTIFIER | USER IDENTIFIER | PRINT COMMAND ACCEPTANCE TIME | DOCUMENT DATA IDENTIFIER | ... |
|---|---|---|---|---|
| A903CC37890A (711) | MH | 2003/05/12 11:35 | VOL1:/PUB/MH/pat0032.doc | ... |
| A903DA198201 | CC (712) | 2003/05/12 13:22 | VOL1:/PUB/RL/mtg030391.txt | ... |
| B2909022AC89 | MH | 2003/05/12 13:25 (713) | VOL2:/PUB/common/stat_exec.xls | ... |
| ⋮ | ⋮ | ⋮ | ⋮ | ⋮ |

*FIG. 18A*

1801

| SHEET IDENTIFIER (1802) | USER IDENTIFIER (1803) | DOCUMENT DATA IDENTIFIER (1804) | COUNTER VALUE (1805) | ... |
|---|---|---|---|---|

*FIG. 18B*

1810

| SHEET IDENTIFIER | USER IDENTIFIER | DOCUMENT DATA IDENTIFIER | COUNTER VALUE | ... |
|---|---|---|---|---|
| A903CC37890A | MH | VOL1:/PUB/MH/pat0032.doc | 450 | ... |
| A903DA198201 | CC | VOL1:/PUB/RL/mtg030391.txt | 473 | ... |
| B2909022AC89 | MH | VOL2:/PUB/common/stat_exec.xls | 491 | ... |
| ... | ... | ... | ... | ... |

1811 1812 1813

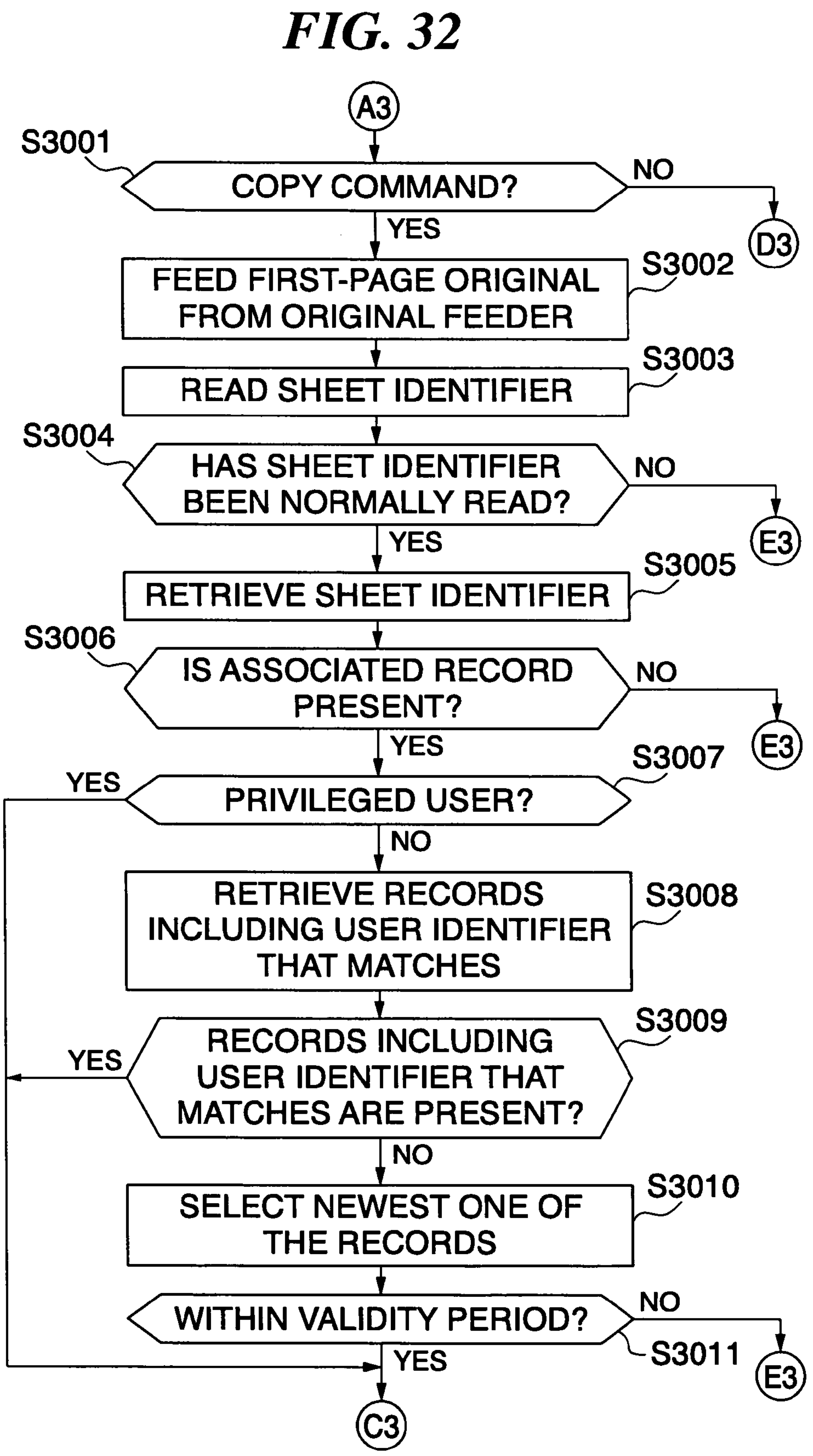
FIG. 32
A3
S3001
COPY COMMAND?
NO
D3
YES
FEED FIRST-PAGE ORIGINAL FROM ORIGINAL FEEDER
S3002
READ SHEET IDENTIFIER
S3003
S3004
HAS SHEET IDENTIFIER BEEN NORMALLY READ?
NO
E3
YES
RETRIEVE SHEET IDENTIFIER
S3005
S3006
IS ASSOCIATED RECORD PRESENT?
NO
E3
YES
PRIVILEGED USER?
S3007
YES
NO
RETRIEVE RECORDS INCLUDING USER IDENTIFIER THAT MATCHES
S3008
RECORDS INCLUDING USER IDENTIFIER THAT MATCHES ARE PRESENT?
S3009
YES
NO
SELECT NEWEST ONE OF THE RECORDS
S3010
WITHIN VALIDITY PERIOD?
NO
S3011
E3
YES
C3

IMAGE FORMING SYSTEM, IMAGE FORMING APPARATUS, CONTROL METHOD THEREFOR AND PROGRAM IMPLEMENTING THE CONTROL METHOD

BACKGROUND OF THE INVENTION

1. Field of the Invention

The present invention relates to an image forming system, an image forming apparatus, a control method therefor, and a program implementing the control method, and more particularly to an image forming system and an image forming apparatus, which are capable of storing document data once having been printed, and when the document data is to be copied, performing a copy process using the stored document data without executing optical image reading of a print sheet subjected to the print process, as well as to a control method therefor and a program implementing the control method.

2. Description of the Related Art

Conventionally, there has been proposed an image forming apparatus, such as a multi-function printer, which stores document data in a server apparatus after having printed out the same, in association with a sheet identifier recorded on a print sheet subjected to the print process, and when the document data is to be copied, determines the original document data by reading the sheet identifier recorded on the print sheet without executing optical image reading of the printed print sheet, and then acquires the document data from the server apparatus for printout (see e.g. Japanese Laid-Open Patent Publication (Kokai) No. H10-308868).

In an image forming apparatus of this kind, in the case of copying document data once having been printed, the copy process is performed using stored document data without using optically read image data, which makes it possible not only to avoid degradation of image quality, but also to achieve a quick copy process. The copy process described above will be hereinafter referred to as “i-copy” throughout the present specification.

However, the conventional i-copy function suffers from the problem that when a print sheet printed with document data and having a sheet identifier recorded thereon happens to be lost and pass to a third party, for example, unauthorized i-copy might be easily carried out by the third party, and therefore high security in the i-copy function cannot be ensured.

SUMMARY OF THE INVENTION

It is an object of the present invention to provide an image forming system, an image forming apparatus, and a control method therefor, which are capable of enhancing security in the i-copy function, and a program implementing the control method.

To attain the above object, in a first aspect of the present invention, there is provided an image forming system comprising a storage unit that stores document data once having been printed, in association with a sheet identifier recorded on a print sheet on which the document data has been printed, an authentication unit that authenticates a user based on an entered user identifier, a reading unit that reads the sheet identifier from the print sheet when a copy command is issued by the user authenticated by the authentication unit, a printing unit that reads out the document data associated with the sheet identifier read by the reading unit, from the storage unit, and prints the document data, and an inhibition unit operable when the sheet identifier has not been read from the print sheet based on the copy command over a predetermined time period, to inhibit the document data associated with the sheet identifier from being printed by the printing unit.

With the arrangement described above, it is possible to provide an image forming system which is capable of enhancing security in the i-copy function.

Preferably, the image forming system comprises an operating section that accepts an operation from a user, and when the user who has been authenticated by the authentication unit and has issued the copy command via the operating section is a user who caused the document data associated with the sheet identifier read by the reading unit to be printed, or a privileged user, the inhibition unit allows the document data associated with the sheet identifier to be printed by the printing unit without inhibiting printing of the document data, even if the sheet identifier has not been read from the print sheet based on the copy command over the predetermined time period.

Preferably, the sheet identifier has been recorded in advance on the print sheet.

Preferably, the sheet identifier is generated and recorded on the print sheet when the document data to be stored in the storage unit is printed.

More preferably, the sheet identifier has been recorded in advance on a non-contact IC attached to the print sheet.

Further preferably, the sheet identifier generated when the document data to be stored in the storage unit is printed is recorded in a non-contact IC attached to the print sheet.

Preferably, the storage unit stores an immediately preceding printing time and the document data in association with the sheet identifier, and the inhibition unit comprises determination unit that determines whether or not the sheet identifier has not been read from the print sheet over the predetermined time period, based on a present time and the immediately preceding printing time stored in the storage unit.

More preferably, the image forming system comprises an operating section that accepts an operation from a user, and a rewriting unit operable when the user who has been authenticated by the authentication unit and has issued the copy command via the operating section is a user who caused the document data associated with the sheet identifier read by the reading unit to be printed, or a privileged user, to overwrite the immediately preceding printing time stored in the storage unit by a present printing time whenever the document data associated with the sheet identifier read by the reading unit is read out from the storage unit and printed by the printing unit.

More preferably, the image forming system comprises a changing unit operable when the user who caused the document data associated with the sheet identifier read by the reading unit to be printed or a privileged user has been authenticated by the authentication unit, and has issued a predetermined change command, to change the immediately preceding printing time stored in the storage unit in association with the document data, according to the predetermined change command.

Preferably, the image forming system further comprises a downcounter that downcounts a count at predetermined time intervals, and the storage unit stores the count of the downcounter in association with the sheet identifier and the document data, and the inhibition unit comprising a determination unit that determines whether or not the sheet identifier has not been read from the print sheet over the predetermined time period, based on the count of the downcounter.

More preferably, the image forming system comprises an operating section that accepts an operation from a user, and a resetting unit operable when the user who has been authenticated by the authentication unit and has issued the copy command via the operating section is a user who caused the document data associated with the sheet identifier read by the reading unit to be printed, or a privileged user, to reset the count of the downcounter stored in the storage unit to a predetermined initial value whenever the document data associated with the sheet identifier read by the reading unit is read out from the storage unit and printed by the printing unit.

More preferably, the image forming system comprises a changing unit operable when the user who caused the document data associated with the sheet identifier read by the reading unit to be printed or a privileged user has been authenticated by the authentication unit, and has issued a predetermined change command, to change the count of the downcounter stored in the storage unit in association with the document data, according to the predetermined change command.

Preferably, the image forming system further comprises an upcounter that upcounts a count at predetermined time intervals, and the storage unit stores the count of the upcounter in association with the sheet identifier and the document data, and the inhibition unit comprises determination unit that determining, based on the count of the upcounter, whether or not the sheet identifier has not been read from the print sheet over a predetermined time period.

More preferably, the image forming system comprises an operating section that accepts an operation from a user, and a resetting unit operable when the user who has been authenticated by the authentication unit and has issued the copy command via the operating section is a user who caused the document data associated with the sheet identifier read by the reading unit to be printed, or a privileged user, to reset the count of the upcounter stored in the storage unit to a predetermined initial value whenever the document data associated with the sheet identifier read by the reading unit is read out from the storage unit and printed by the printing unit.

More preferably, the image forming system comprises a changing unit operable when the user who caused the document data associated with the sheet identifier read by the reading unit to be printed or a privileged user has been authenticated by the authentication unit and has issued a predetermined change command, to change the count of the upcounter stored in the storage unit in association with the document data, according to the predetermined change command.

Preferably, the image forming system further comprises a generation unit that generates the sheet identifier whenever document data to be stored or having been stored is printed on a print sheet, a recording unit that records the sheet identifiers generated by the generation unit, one by one, on the print sheet, and a registration unit that generates records each including the sheet identifier generated by the generation unit and an identifier of the document data, one by one, and registers the generated records anew in the storage unit.

To attain the above object, in a second aspect of the present invention, there is provided an image forming apparatus capable of accessing a server apparatus that stores and distributes document data once having been printed, in association with a sheet identifier recorded on a print sheet on which the document data has been printed, comprising an authentication unit that authenticates a user based on an entered user identifier, a reading unit that reads the sheet identifier from the print sheet when a copy command is issued by the user authenticated by the authentication unit, a printing unit that reads out the document data associated with the sheet identifier read by the reading unit, from the server apparatus, and prints the document data, and an inhibition unit operable when the sheet identifier has not been read from the print sheet based on the copy command over a predetermined time period, to inhibit the document data associated with the sheet identifier from being printed by the printing unit.

To attain the above object, in a third aspect of the present invention, there is provided a method of controlling an image forming system, comprising a storage step of storing document data once having been printed, in association with a sheet identifier recorded on a print sheet on which the document data has been printed, an authentication step of authenticating a user based on an entered user identifier, a reading step of reading the sheet identifier from the print sheet when a copy command is issued by the user authenticated in the authentication step, a printing step of reading out the document data associated with the sheet identifier read in the reading step, from document data stored in the storage step, and printing the document data read out, and an inhibition step of inhibiting the document data associated with the sheet identifier from being printed in the printing step, when the sheet identifier has not been read from the print sheet based on the copy command over a predetermined time period.

To attain the above object, in a fourth aspect of the present invention, there is provided a method of controlling an image forming apparatus capable of accessing a server apparatus that stores and distributes document data once having been printed, in association with a sheet identifier recorded on a print sheet on which the document data has been printed, comprising an authentication step of authenticating a user based on an entered user identifier, a reading step of reading the sheet identifier from the print sheet when a copy command is issued by the user authenticated in the authentication step, a printing step of reading out the document data associated with the sheet identifier read in the reading step, from the server apparatus, and printing the document data, and an inhibition step of inhibiting the document data associated with the sheet identifier from being printed in the printing step, when the sheet identifier has not been read from the print sheet based on the copy command over a predetermined time period.

To attain the above object, in a fifth aspect of the present invention, there is provided a program for controlling an image forming apparatus capable of accessing a server apparatus that stores and distributes document data once having been printed, in association with a sheet identifier recorded on a print sheet on which the document data has been printed, comprising an authentication module for authenticating a user based on an entered user identifier, a reading module for reading the sheet identifier from the print sheet when a copy command is issued by the user authenticated by the authentication module, a printing module for reading out the document data associated with the sheet identifier read by the reading module, from the server apparatus, and printing the document data, and an inhibition module for inhibiting the document data associated with the sheet identifier from being printed by the printing module, when the sheet identifier has not been read from the print sheet based on the copy command over a predetermined time period.

The above and other objects, features, and advantages of the present invention will become more apparent from the following detailed description taken in conjunction with the accompanying drawings.

BRIEF DESCRIPTION OF THE DRAWINGS

FIG. 7A is a diagram showing the structure of print command record data generated in a step S611 in FIG. 6;

FIG. 7B is a diagram showing an example of a print command record data list generated in the step S611 in FIG. 6;

FIG. 18A is a diagram showing the structure of print command record data generated in a step S1711 in FIG. 17;

FIG. 18B is a diagram showing an example of a print command record data list generated in the step S1711 in FIG. 17;

FIG. 32 is a flowchart of an image forming process (process relating to a print command) according to a seventh embodiment of the present invention;

DETAILED DESCRIPTION OF THE PREFERRED EMBODIMENTS

The present invention will now be described in detail with reference to the drawings showing preferred embodiments thereof.

Figure 1:
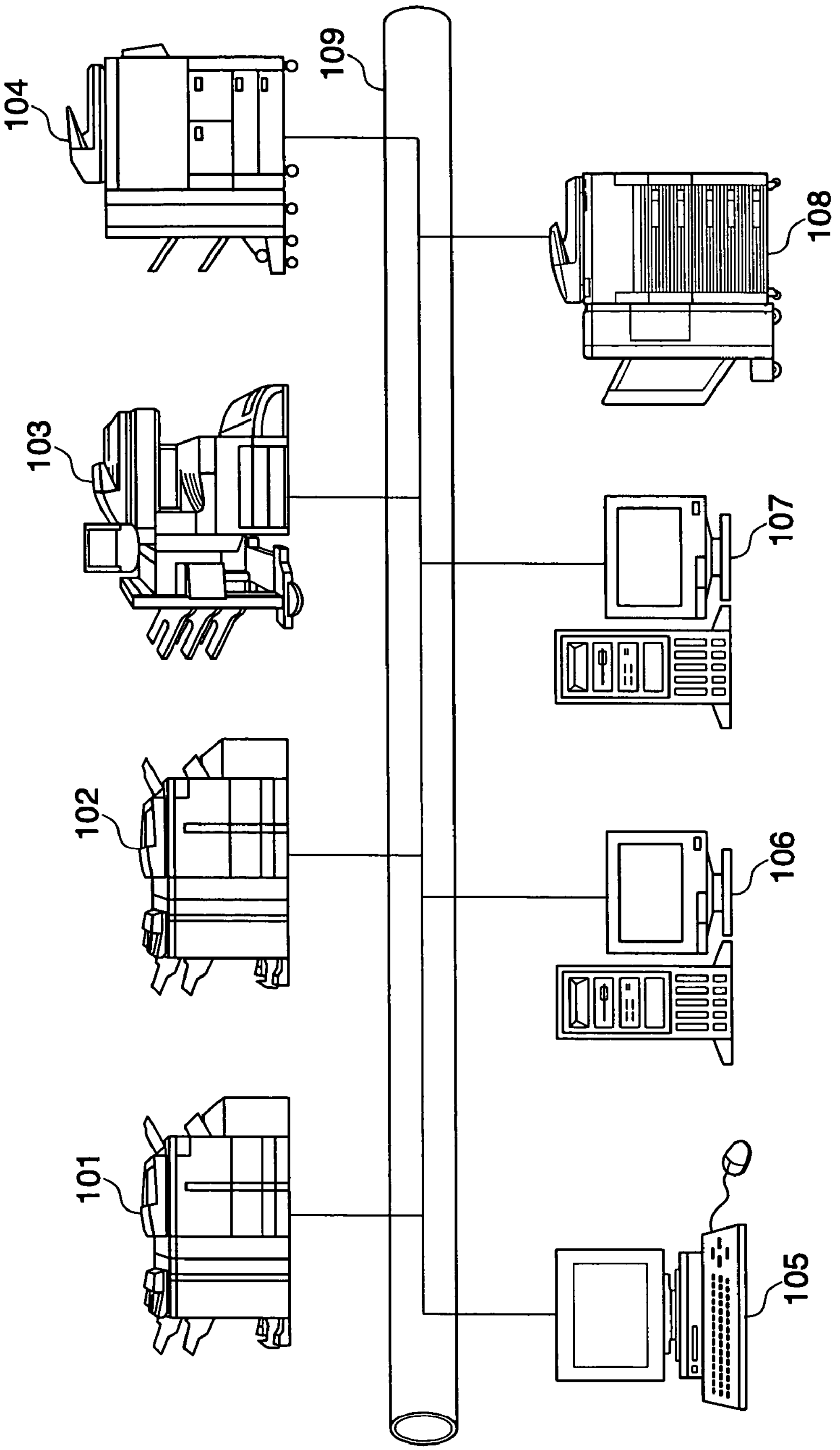
FIG. 1 is a diagram schematically showing the arrangement of a network including image forming apparatuses according to a first embodiment of the present invention.

FIG. 1 is a diagram schematically showing the arrangement of a network including image forming apparatuses according to a first embodiment of the present invention.

As shown in FIG. 1, a LAN 109 has connected thereto multi-function printers (MFPs) 101, 102, 103, 104, and 108 as image forming apparatuses, and information processing apparatuses 105, 106, and 107, such as personal computers. At least one of the information processing apparatuses 105, 106, and 107 functions as a server apparatus for storing and managing document data once having been printed by the multi-function printers (MFPs) 101, 102, 103, 104, and 108.

Figure 2:
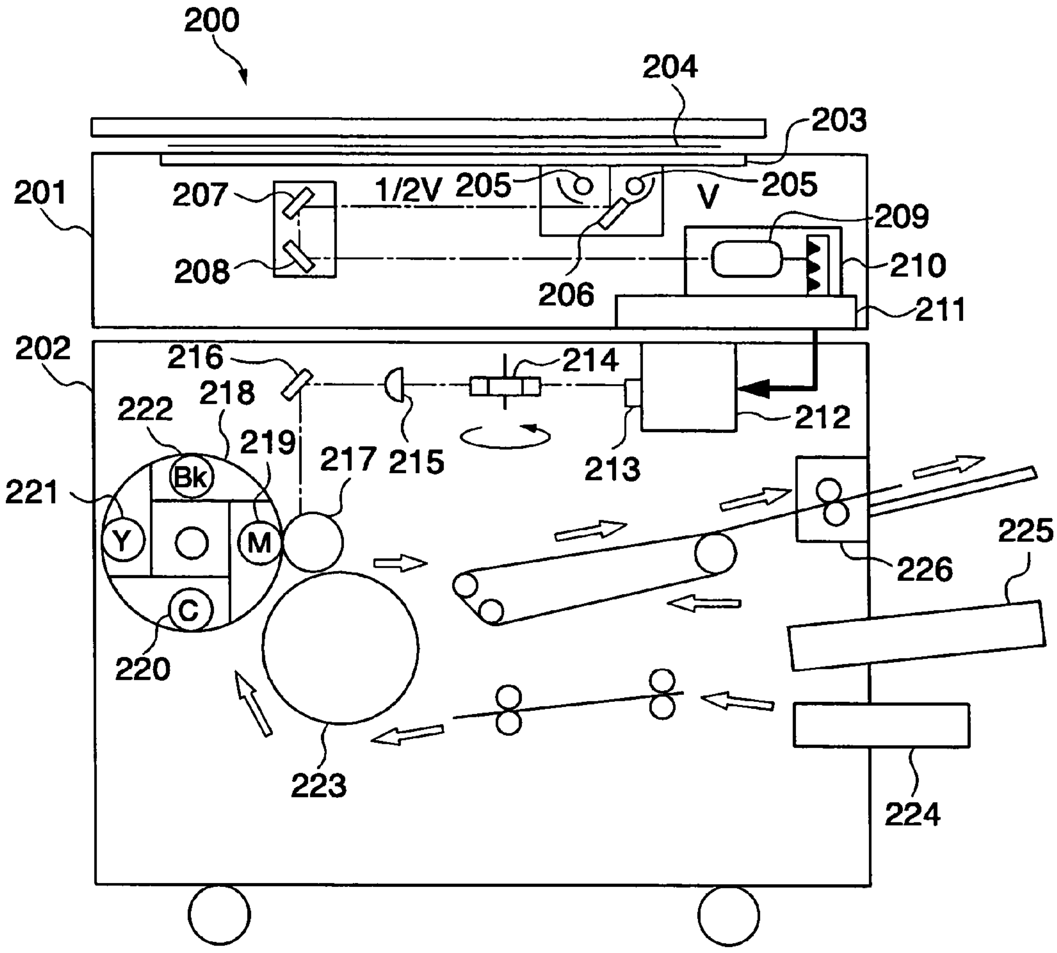
FIG. 2 is a side cross-sectional view schematically showing the mechanical arrangement of a multi-function printer as one of the image forming apparatuses appearing in FIG. 1.

FIG. 2 is a cross-sectional view schematically showing the mechanical arrangement of one of the MFPs appearing in FIG. 1.

As shown in FIG. 2, the MFP 200 is comprised of an image reader section 201 that reads original images, and a printer section 202 that prints image data read by the image reader section 201 or data input from external apparatuses. The image reader section 201 reads an original image with a resolution e.g. of 400 dpi (dots/inch), and carries out digital signal processing on the read image, while the printer section 202 prints out an image based on image data input from the image reader section 201 or another apparatus, with a resolution e.g. of 1200 dpi.

In the image reader section 201, an image on an original 204 fed onto an original platen glass 203 from an original feeder, not shown, is scanned while being exposed to light by moving a pair of lit lamps 205. A reflected light image reflected from the original 204 by the exposure and scanning enters a 3-line CCD sensor 210 via mirrors 206, 207, and 208, and a lens 209. The 3-line CCD sensor 210 photoelectrically converts each of the R (red), G (green), and B (blue) color components of the input reflected light image into an electronic color image signal, and delivers the electronic color image signals to a signal processing section 211. During the exposure and scanning of an original image, a unit comprised of the lamps 205 and the mirror 206 is controlled to move twice faster than a unit comprised of the mirrors 207 and 208.

The signal processing section 211 converts the R, G, and B image signals input from the 3-line CCD sensor 210 into M (magenta), C (cyan), Y (yellow), and Bk (black) image signals, and delivers the M, C, Y, and Bk image signals to a laser driver 212 of the printer section 202. By each exposure and scanning operation, an image signal indicative of one color component of the M, C, Y, and Bk colors is delivered to the laser driver 212, and therefore it is necessary to perform four exposure and scanning operations for delivery of a complete original image on one sheet.

The laser driver 212 modulates a laser beam emitted from a semiconductor laser 213, based on an image signal delivered from the signal processing section 211 or an image signal input via a NIC (Network Interface Card) 311, described in detail hereinafter. The laser beam emitted from the semiconductor laser 213 is irradiated onto a photosensitive drum 217 via a polygon mirror 214, a f-θ lens 215, and a mirror 216. At this time, the polygon mirror 214 causes the laser beam to scan the photosensitive drum 217 in the main scanning direction, whereby an electrostatic latent image is formed on the photosensitive drum 217.

A rotary developing device 218 is comprised of a magenta developing section 219, a cyan developing section 220, a yellow developing section 221, and a black developing section 222. These four developing sections cyclically come into contact with the photosensitive drum 217, whereby electrostatic latent images of the respective M, C, Y, and Bk colors, which are sequentially formed on the photosensitive drum 217, are sequentially developed with toners corresponding to the respective colors.

A transfer drum 223 has wound thereon a recording sheet fed from a sheet cassette 224 or 225, and sequentially transfers onto the recording sheet the M, C, Y, and Bk toner images sequentially formed on the photosensitive drum 217.

In this way, the electrostatic latent image forming process, the developing process, and the transfer process are performed for each of the M, C, Y, and Bk image signals, whereby the M, C, Y, and Bk toner images are transferred onto the same recording sheet in a superimposed manner to thereby form a full-color image. The recording sheet with the full-color image formed thereon is separated from the transfer drum 223, and then a fixing process is performed on the toner image by a fixing unit 226, whereafter the recording sheet is discharged.

Figure 3:
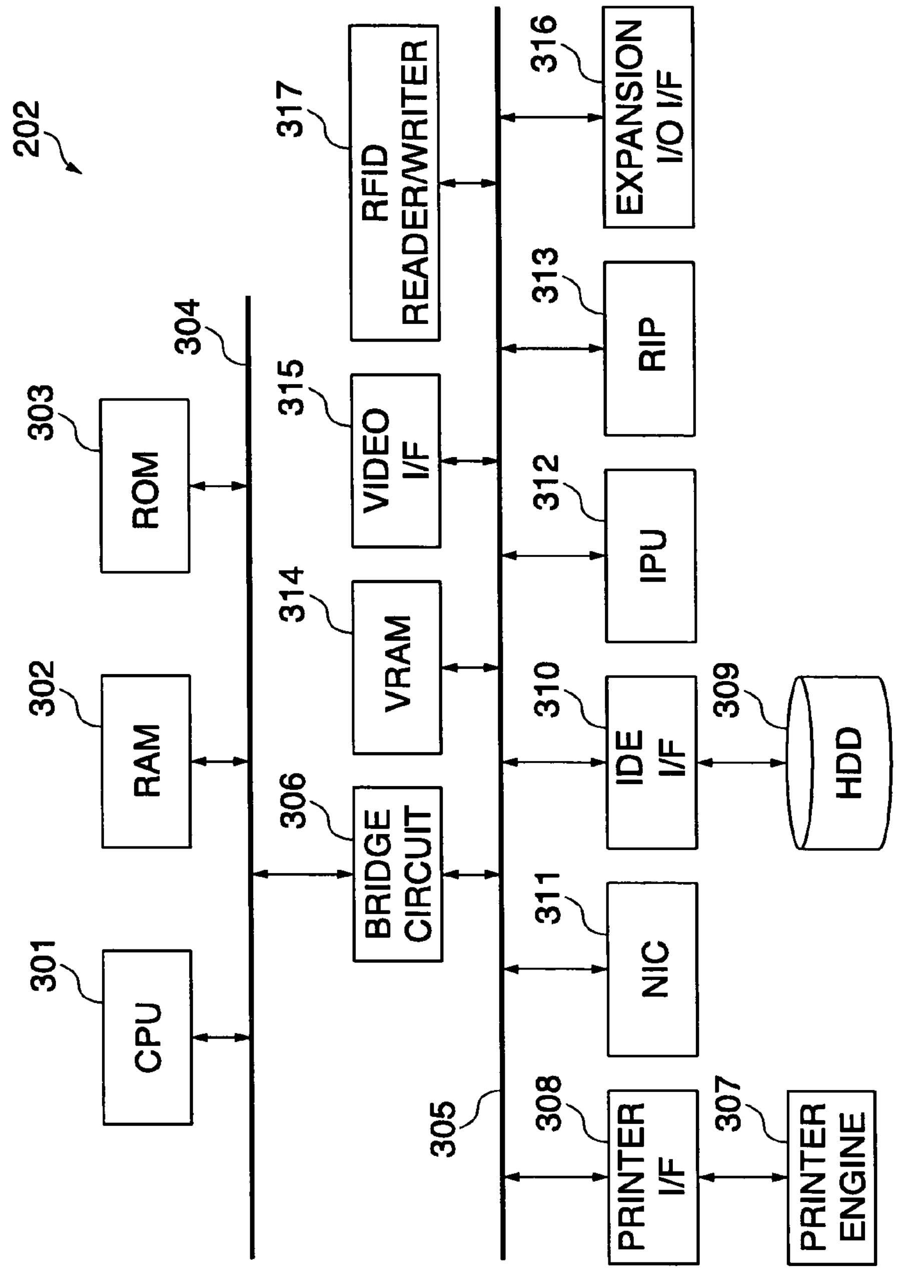
FIG. 3 is a block diagram showing the hardware configuration of a printer section of the multi-function printer in FIG. 2.

Next, a description will be given of the hardware configuration of a control section of the printer section 202 with reference to FIG. 3.

The control section of the printer section 202 includes a local bus 304 and an I/O bus 305 connected to the local bus 304 by a bridge circuit 306. A CPU 301, a RAM 302, and a ROM 303 are connected to the local bus 304. Connected to the I/O bus 305 are a printer I/F 308, a hard disk I/F (IDE I/F) 310, the network interface controller (NIC) 311, an image processing unit (IPU) 312, a raster image processor (RIP) 313, a video RAM (VRAM) 314, a video I/F 315, an expansion I/O I/F 316, and a radio frequency-identification (RFID) reader and writer 317. A printer engine 307 is connected to the printer I/F 308, and the hard disk drive (HDD) 309 is connected to the IDE I/F 310.

A boot program stored in the ROM 303 causes the CPU 301 to load a system program and application programs stored in the HDD 309 into the RAM 302, and the system program and the application programs cooperate to cause the CPU 301 to perform various kinds of operations for controlling the printer section 202. The RAM 302 is also used as a work area for temporarily storing results of various computations carried out by the CPU 301, image data, and so forth, and the ROM 303 stores font data for use in converting character code data into character image data.

The bridge circuit 306 is used to break connection between the local bus 304 and the I/O bus 305. This breaking function enables the CPU 301 to access the RAM 302 and the ROM 303 via the local bus 304 while image data is being transferred from the printer I/F 308 to the RIP 313 via the I/O bus 305. The printer engine 307 is comprised of the component elements 212 to 226 of the printer section 202. The printer I/F 308 connects between the printer engine 307 and the I/O bus 305, and transfers image data stored in the RAM 302 to the laser driver 212 of the printer engine 307 according to an instruction from the CPU 301. The IDE I/F 310 accesses the HDD 309 under the control of the CPU 301. The HDD 309 also stores an application program for executing an image forming process described in detail hereinafter with reference to FIGS. 6, and 8 to 13, and spools image data.

The NIC 311 is used to transmit and receive image data and the like to and from external device and apparatuses, such as personal computers, via a network, such as a local area network. The IPU 312 is provided to perform image processing including resolution conversion. The RIP 313 converts page description language-based image data received from the external device or apparatus via the NIC 311 into bitmap data under the control of the CPU 301, and loads the bitmap data in the RAM 302.

Display data to be displayed on a display panel, not shown, of an operating section, not shown, is written into the VRAM 314, and then output to the display panel via the video I/F 315. The expansion I/O I/F 316 is an interface circuit via which the CPU 301 communicates with a cellular phone, not shown, for example. The RFID reader and writer 317 is disposed in the vicinity of the sheet cassette 225 to perform radio communication for data access to a RFID tag (non-contact IC), referred to hereinafter, attached to a print sheet.

Figure 4:
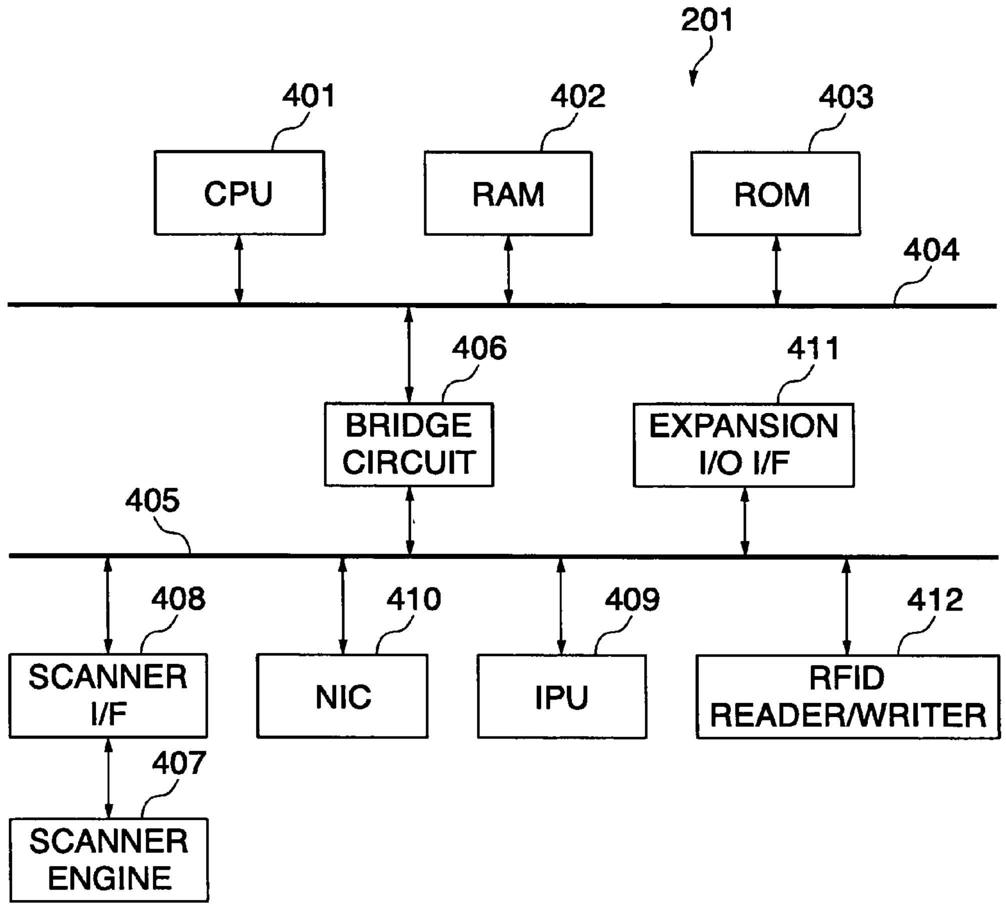
FIG. 4 is a block diagram showing the hardware configuration of an image reader section of the multi-function printer in FIG. 2.

FIG. 4 is a block diagram showing the hardware configuration of a control section of the image reader section 201. As shown in FIG. 4, the control section of the image reader section 201 includes the same devices as the control section of the printer section 202 shown in FIG. 3, and therefore a description will be briefly given of only different points.

The control section of the image reader section 201 is different from the that of the printer section 202 in that devices corresponding to the RIP 313, the VRAM 314, and the video I/F 315 are not provided, and a scanner I/F 408 and a scanner engine 407 are provided as devices corresponding to the printer I/F 308 and the printer engine 307. An RFID reader and writer 412 is disposed in the vicinity of the boundary between the original feeder and the original platen glass 203 to perform radio communication for data access to the RFID tag (non-contact IC) attached to the original (printed print sheet).

The scanner engine 407 is comprised of the component elements 203 to 211 of the image reader section 201. The scanner I/F 408 connects between the scanner engine 407 and an I/O bus 405, and transfers image data output from the scanner engine 407 to a RAM 402 according to an instruction from a CPU 401.

Figure 5:
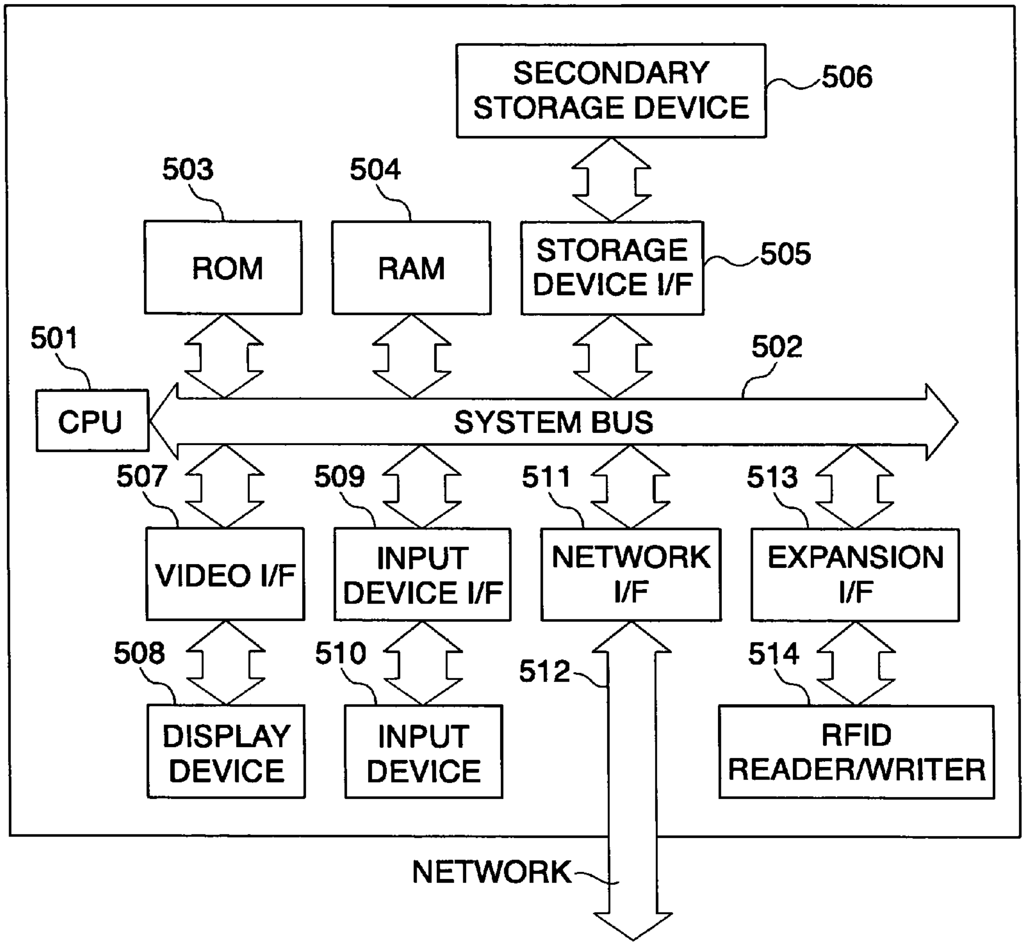
FIG. 5 is a block diagram showing the hardware configuration of one of information processing apparatuses appearing in FIG. 1.
Figure 6:
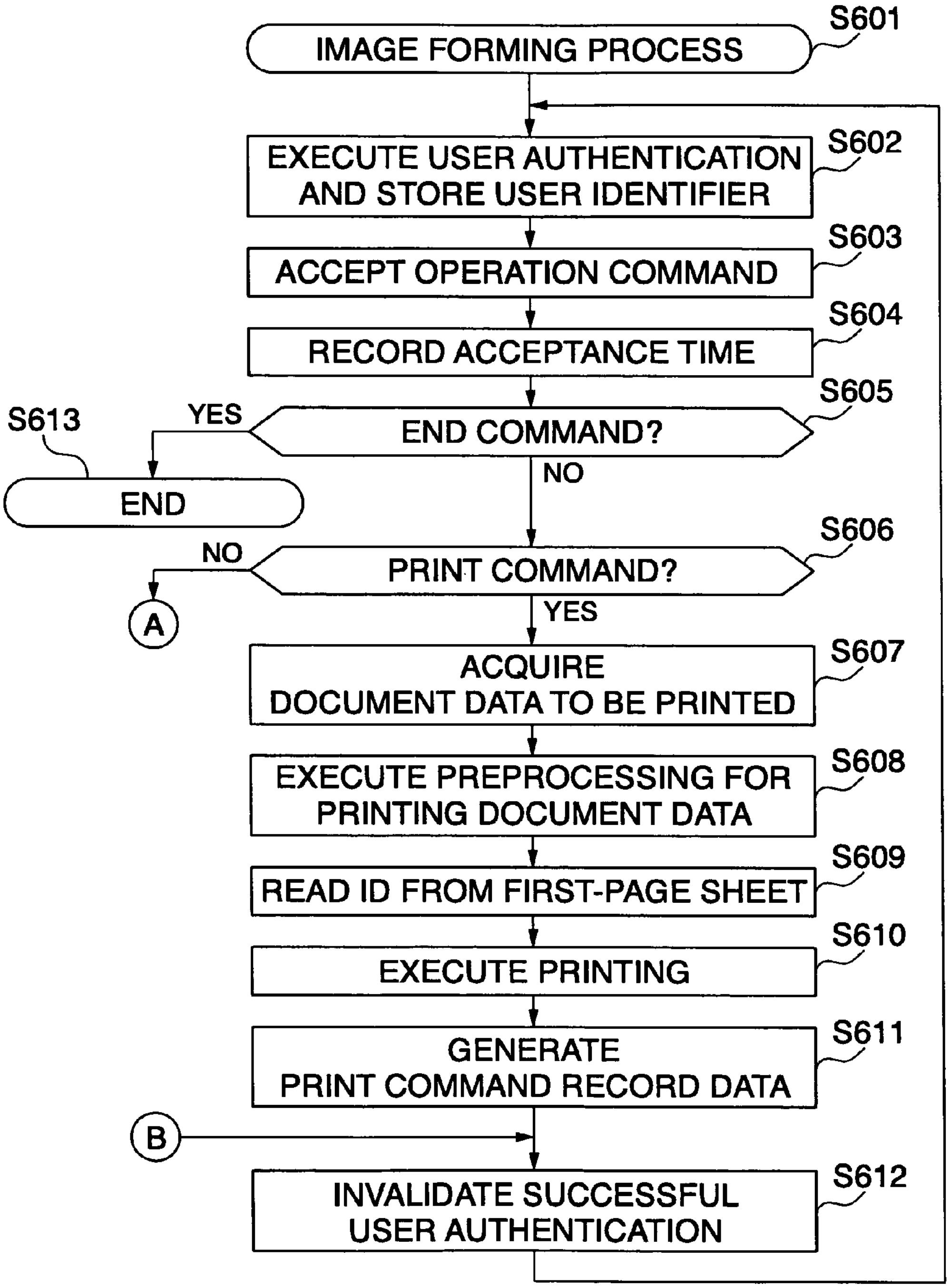
FIG. 6 is a flowchart of a first image forming process executed by the multi-function printer in FIG. 2.
Figure 8:
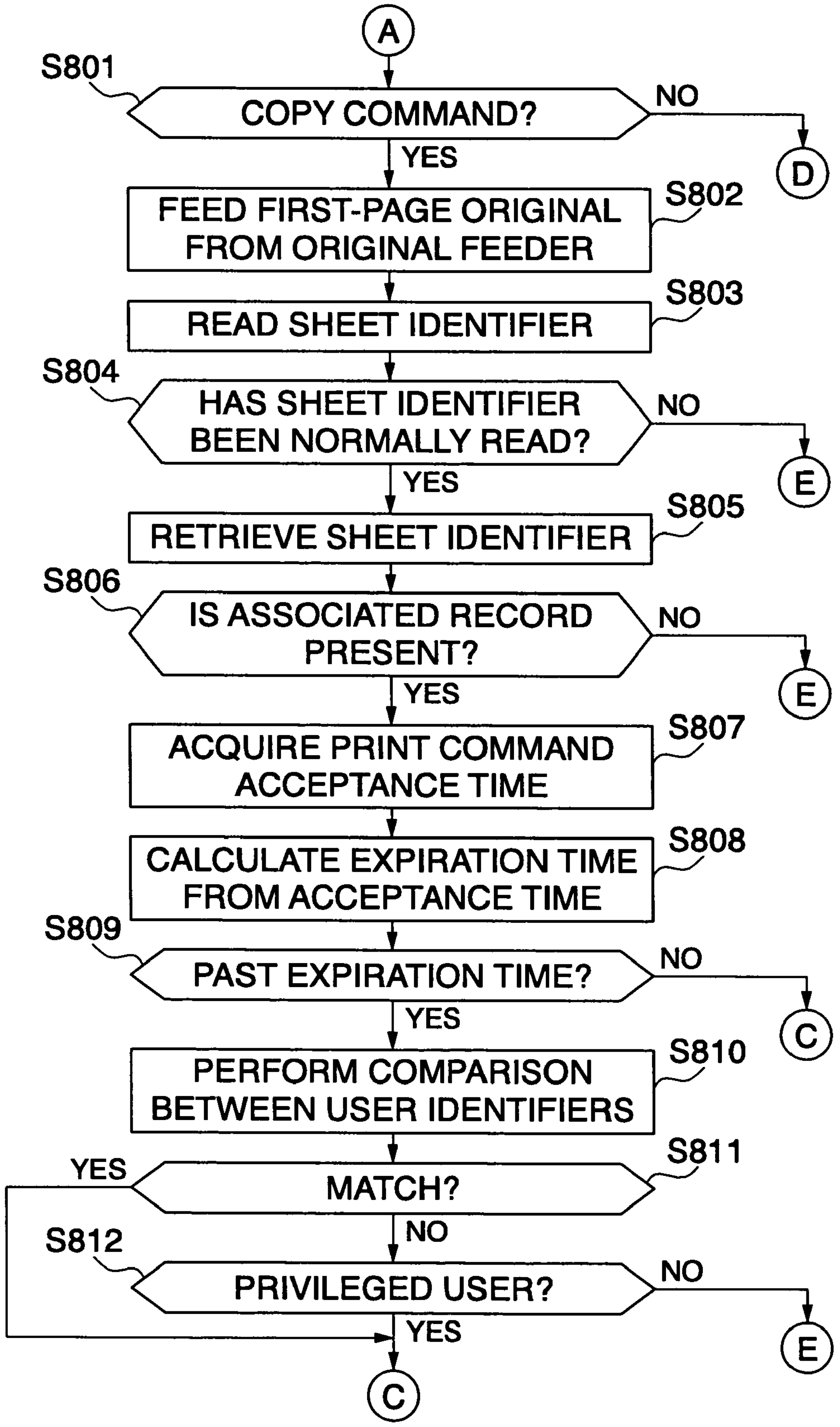
FIG. 8 is a continued part of the flowchart in FIG. 6.

FIG. 5 is a block diagram schematically showing the hardware configuration of one of the information processing apparatuses appearing in FIG. 1.

As shown in FIG. 5, the information processing apparatus is comprised of a CPU 501, a ROM 503, a RAM 504, a storage device I/F 505, a secondary storage device 506, a video I/F 507, a display device 508, an input device I/F 509, an input device 510, a network I/F 511, a network 512, an expansion I/F 513, and an RFID reader and writer 514. These devices are interconnected via a system bus 502.

The CPU 501 executes a boot program stored in the ROM 503 to read out a system program from the secondary storage device 506 via the storage device I/F 505 to load the system program into the RAM 504, and the CPU 501 executes application programs in cooperation with the system program. For example, when a command for starting an application program is input from the input device 510 via the input device I/F 509, the CPU 501 reads out the application program designated by the command from the secondary storage device 506 and loads the application program into the RAM 504. Thereafter, the CPU 501 executes the application program on the RAM 504 in response to an operation of the input device 510, in cooperation with the system program, to thereby carry out a process according to the application program.

The ROM 503 stores not only the boot program but also a BIOS that performs input and output controls. The RAM 504 is used by the CPU 501, as a work area for carrying out various kinds of processing. When the present information processing apparatus functions as the aforementioned server apparatus, the secondary storage device 506 stores a print command record data list 710, described in detail hereinafter with. reference to FIG. 7B, document data associated with document data identifiers 705 contained in the print command record data list 710, and authentication data for use in user authentication.

Data indicative of a processing state in each process executed by the CPU 501 is displayed on the display device 508 via the video I/F 507. The network I/F 511 functions as an interface with the network 512, such as the LAN 109 appearing in FIG. 1, to transmit and receive document data to and from the MFPs appearing in FIG. 1. The expansion I/F 513 is used to connect various peripheral devices to the information processing apparatus, for example, connect the RFID reader and writer 514 to the information processing apparatus. The RFID reader and writer 514 perform data access to the RFID tag (non-contact IC) by radio communication.

Next, a description will be given of an image forming process carried out by the MFP 200 shown in FIG. 2 with reference to the flowchart shown in FIGS. 6, and 8 to 13. The present image forming process is mainly carried out by the CPU 301 of the MFP 200, and therefore in the following description, it is assumed that the CPU 301 executes operations unless otherwise specified (which applies image forming processes according to second to seventh embodiments described hereinafter).

When a user provides an instruction for starting the image forming process (step S601), the CPU 301 executes user authentication in a step S602. When the user authentication is successfully performed, the CPU 301 stores a user identifier (ID) of the user in the RAM 302 for use in the following processing. Then, an operation command is entered by a user operation (step S603), the CPU 301 accepts the operation command, records input time, i.e. acceptance time, of the entered operation command in the RAM 302 (step S604), and determines whether or not the operation command is an end command (step S605). If the operation command is an end command (YES to step S605), the present image forming process is terminated (step S613), whereas if the entered operation command is neither an end command nor a print command (NO to steps S605 and S606), the process proceeds to a step S801, referred to hereinafter.

The operation command includes an end command, a print command, a copy command, a copy inhibition cancel command, a validity expiration time cancel command, and a copy inhibition command.

The user identifier including a user name and a password for user authentication may be entered via the input device 510 of the information processing apparatus, a portable apparatus connected to the MFP 200 via the expansion I/O I/F 316, or an operation panel, not shown, of the operating section of the MFP 200. Alternatively, the user name and the password recorded in advance in a magnetic card or a card-type RFID tag may be read by a magnetic reading and writing device or the RFID reader and writer, to be input to the MFP 200.

On the other hand, if the entered operation command is a print command (YES to step S606), the CPU 301 acquires document data designated by the print command for printing (step S607). Document data for printing is generally transmitted together with a print command from the information processing apparatus or another MFP, but document data stored in the HDD 309 of the MFP 200 may be designated by a print command for printing.

Next, the CPU 301 carries out preprocessing for printing the document data (step S608). For example, the CPU 301 converts the document data expressed in the page description language into raster image data. Then, the CPU 301 causes a print sheet with the RFID tag attached thereto to be picked up and fed as a first-page sheet, from the sheet cassette 225, and causes the RFID reader and writer 317 to read a sheet identifier stored in the RFID tag, followed by storing the sheet identifier in the RAM 302 (step S609).

Then, the CPU 301 prints the preprocessed document data (step S610), generates predetermined print command record data (step S611), and invalidates the successful user authentication (step S612), followed by repeatedly carrying out the steps S602 et seq. In printing the second and following pages of the document data, inexpensive ordinary sheets without the RFID tag are used. Further, as shown in FIG. 7A, the print command record data (hereinafter also simply referred to as "the record") 701 generated in the step S611 is comprised of data items of the sheet identifier 702 read in the step S609, the user identifier 703 acquired in the step S602, the print command acceptance time 704 recorded in the step S604, and the document data identifier 705 contained in the print command accepted in the step 603, and transmitted to the server apparatus.

The server apparatus collects print command record data or records 701 sent from the MFPs 101 to 104 and 108, and collectively manages these records as the print command record data list 710 as shown in FIG. 7B. Each record in the print command record data list 710 corresponds to a single print job (command) or a single copy job (command). For example, a record 711 indicates that the associated print command was issued at "11:35 on May 12, 2003" by a user "MH", the associated printed document data is a document data file identified by a document data identifier 705 "VOL1:/PUB/MH/pat0032.doc", and the sheet identifier 702 attached to a print sheet used for printing is "A903CC37890A". Records 712 and 713 are similarly formed.

If the operation command accepted in the step S603 is a copy command (YES to the step S801), the CPU 301 causes the original feeder to feed a first-page original, i.e. the printed print sheet therefrom (step S802), and instructs the RFID reader and writer 412 to read the sheet identifier 702 from the RFID tag attached to the original, whereby the sheet identifier 702 is read from the RFID tag (step S803). In the step S803, a photoelectric conversion device may replace the RFID reader and writer 412 to read the sheet identifier 702 printed on the original in the form of a bar code or the like.

Figure 9:
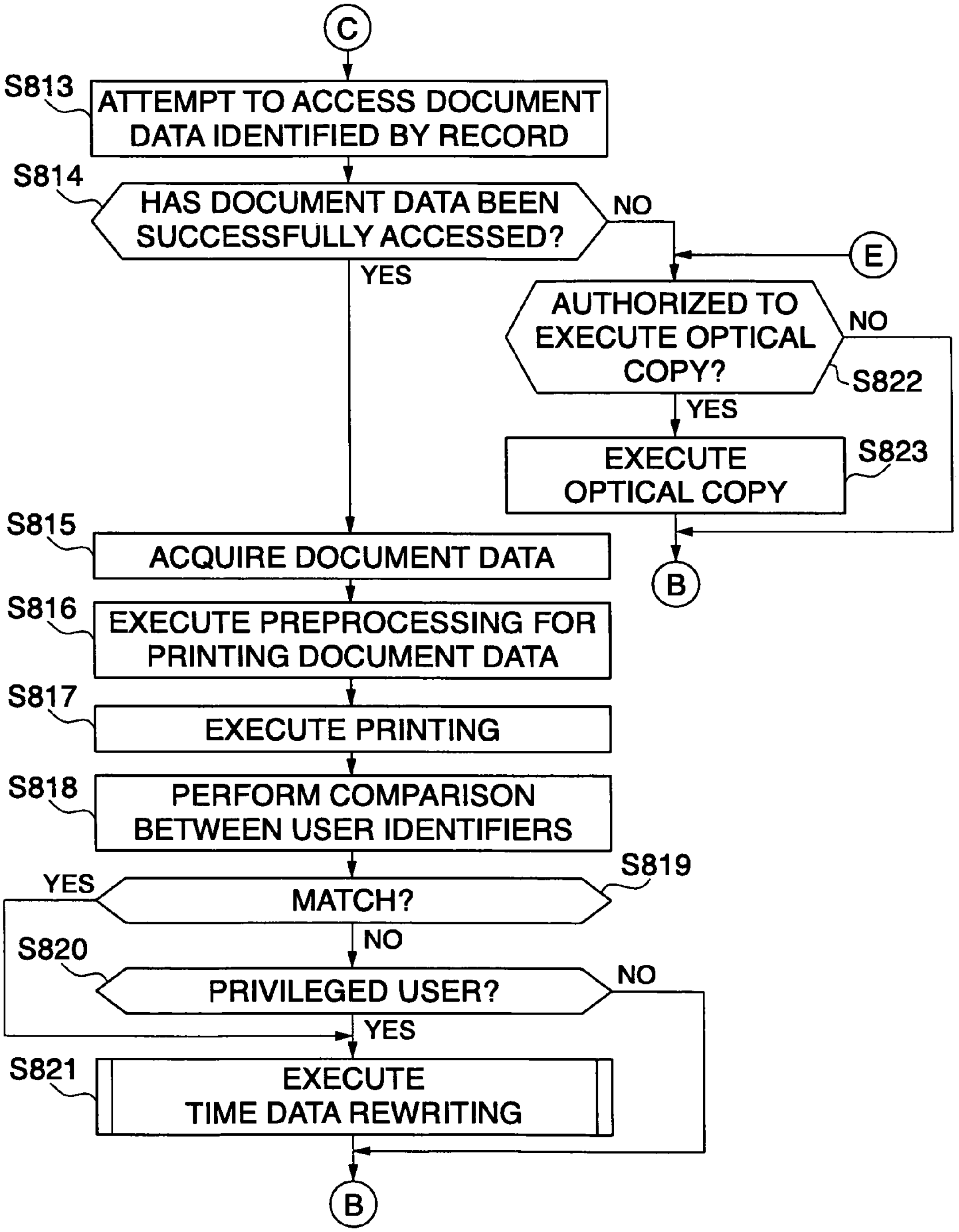
FIG. 9 is a continued part of the flowchart in FIG. 8.

If the sheet identifier 702 cannot be normally read (NO to a step S804), the CPU 301 determines whether or not the user who has been successfully authenticated in the step S602 is authorized to perform optical copying by photoelectric conversion (step S822 in FIG. 9). If it is determined that the user is authorized to perform optical copying (YES to the step S822), the CPU 301 causes a normal optical copy process to be executed for optically reading and printing an original image (step S823 in FIG. 9), and then the process returns to the step S612, wherein the successful user authentication is invalidated.

If the sheet identifier 702 has been normally read (YES to step S804), the CPU 301 inquires of the server apparatus whether or not the print command record data list 710 has an entry of the sheet identifier 702 (step S805). If the print command record data list 710 has an entry of the sheet identifier 702, a record including the sheet identifier 702 is sent from the server apparatus to the CPU 301 of the MFP 200 which has made the inquiry, whereas if there is no entry of the sheet identifier 702, the server apparatus sends a message to that effect to the CPU 301 of the MFP 200.

When the CPU 301 has received the message to the effect that there is no entry of the sheet identifier 702 (NO to step S806), the process proceeds to the step S822, wherein the CPU 301 determines whether or not the user is authorized to perform optical copy. On the other hand, when there is an entry of the sheet identifier 702, and therefore the CPU 301 has received the record including the sheet identifier 702 (YES to step S806), the CPU 301 extracts the print command acceptance time 704 from the record (step S807), calculates a validity expiration time of the document data (step S808), and determines whether or not the present time is past the validity expiration time (step S809). If the present time is not past the validity expiration time, the process proceeds to a step S813, referred to hereinafter. It is assumed that data indicative of the validity period (e.g. two days) is set in advance in the HDD 309 or in the application program for the present image forming process.

On the other hand, if the present time is past the validity expiration time (YES to the step S809), the CPU 301 performs comparison between the user identifier of the user who has been successfully authenticated and the user identifier 703 in the print command record data (record) acquired from the server apparatus in the step S805. If they match each other, i.e. if the user who caused the MFP 200 to print the document data for i-copy in the step S610 has issued the copy command (YES to a step S811), the process proceeds to the step S813, referred to hereinafter. On the other hand, if the user identifier of the user who has been successfully authenticated and the user identifier 703 in the record do not match each other, the CPU 301 determines whether or not the user who has been successfully authenticated is a privileged user.(step S812). If the user is a privileged user, the process proceeds to the step S813, whereas if the user is not a privileged user, the process proceeds to the step S822, wherein the CPU 301 determines whether or not the user is authorized to perform optical copy.

When the present time is not past the validity expiration time (NO to the step S809), or when the present time is past the validity expiration time but the record has an entry of the user identifier of the user who has been successfully authenticated (YES to the step S811) or when the user is a privileged user (YES to the step S812), the process proceeds to the step S813, wherein the CPU 301 attempts to access the document data identified by the document data identifier 705 in the record which was acquired in the step S805. The CPU 301 makes this attempt by sending an inquiry command including the document data identifier 705 to the server apparatus.

When the CPU 301 has failed in accessing the document data (NO to a step S814), the process proceeds to the step S822, wherein the CPU 301 determines whether or not the user is authorized to perform normal optical copy. On the other hand, when the CPU 301 has been successful in accessing the document data (YES to the step S814), the CPU 301 actually acquires the document data (step S815), executes predetermined preprocessing for printing the document data (step S816), and carries out printing, i.e. the i-copy (step S817).

Then, the CPU 301 performs comparison between the user identifier of the user who has been successfully authenticated and the user identifier 703 in the record acquired from the server apparatus in the step S805 (step S818). If they match each other, i.e. if the user who caused the MFP 200 to print the document data for i-copy in the step S610 has issued the copy command (YES to a step S819), the process proceeds to a step S821, referred to hereinafter. On the other hand, if the user identifier of the user who has successfully authenticated and the user identifier 703 in the record do not match each other, the CPU 301 determines whether or not the user who has been successfully authenticated is a privileged user (step S820). If the user is a privileged user, the process proceeds to the step S821, whereas if the user is not a privileged user, the process proceeds to the step S612, wherein the CPU 301 invalidates the successful user authentication.

If the user who caused the MFP 200 to print the document data for i-copy in the step S610 or a privileged user has issued the copy command, the process proceeds to the step S821, wherein the print command acceptance time 704 in the record acquired from the server apparatus in the step S805 is overwritten by the acceptance time recorded in the step S604, and the rewritten record is sent to the server apparatus. Then, the server apparatus overwrites the corresponding record by the received record (time data rewriting process). Then, the process proceeds to the step S612, wherein the CPU 301 invalidates the successful user authentication.

In this way, the user who has been successful in the user authentication is allowed to perform the i-copy at any time within the i-copy validity period, even if the user is neither the user who caused the MFP 200 to print the document data for i-copy in the step S610, nor a privileged user. Further, the user who caused the MFP 200 to print the document data for i-copy in the step S610 or a privileged user is allowed to perform the i-copy at any time, regardless of the i-copy validity period, and to extend the i-copy validity period whenever the i-copy is carried out.

In rewriting the print command acceptance time in the step S821, assuming that the expiration time of the i-copy validity period is set e.g. to two days after a time recorded as the print command acceptance time, if the print command acceptance time is directly overwritten by a time when the copy command was accepted, the document data for i-copy will be valid for two days after a time when the document data is copied. However, it is also possible to calculate a time one day earlier than the time when the copy command was accepted, and overwrite the print command acceptance time by the calculated time. In this case, the document data for i-copy will be valid for only one day after the time when the document data is copied. Further, it is possible to calculate the time one day earlier than the time when the document data was copied, and compare the calculated time with the original print command acceptance time. In this rewriting process, in the case where the print command was accepted twelve hours ago, for example, if the print command acceptance time is overwritten by the time one day earlier than the time when the copy command was accepted, the i-copy validity period of the present printed document data will expire before the original validity expiration time, which can cause inconvenience. To avoid this inconvenience, a variation shown in FIG. 10 can be substituted for the time data rewriting process executed in the step S821.

Figure 10:
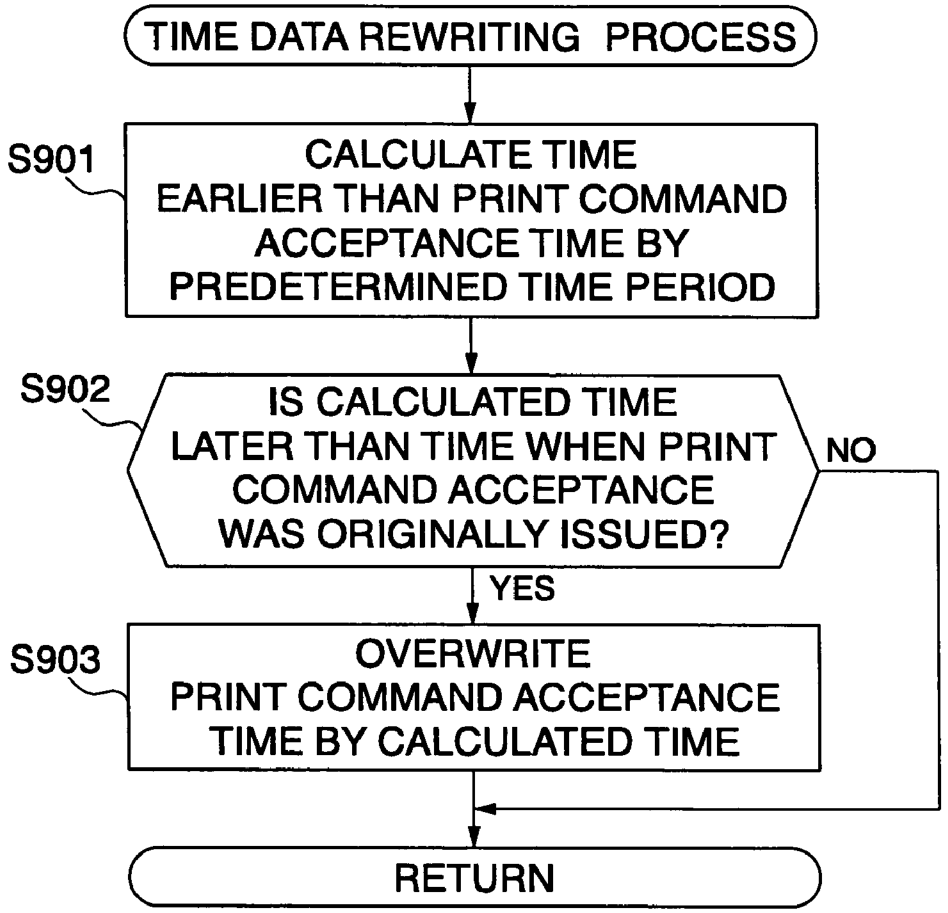
FIG. 10 is a flowchart showing details of a time data rewriting process executed in a step S821 in FIG. 9.
Figure 11:
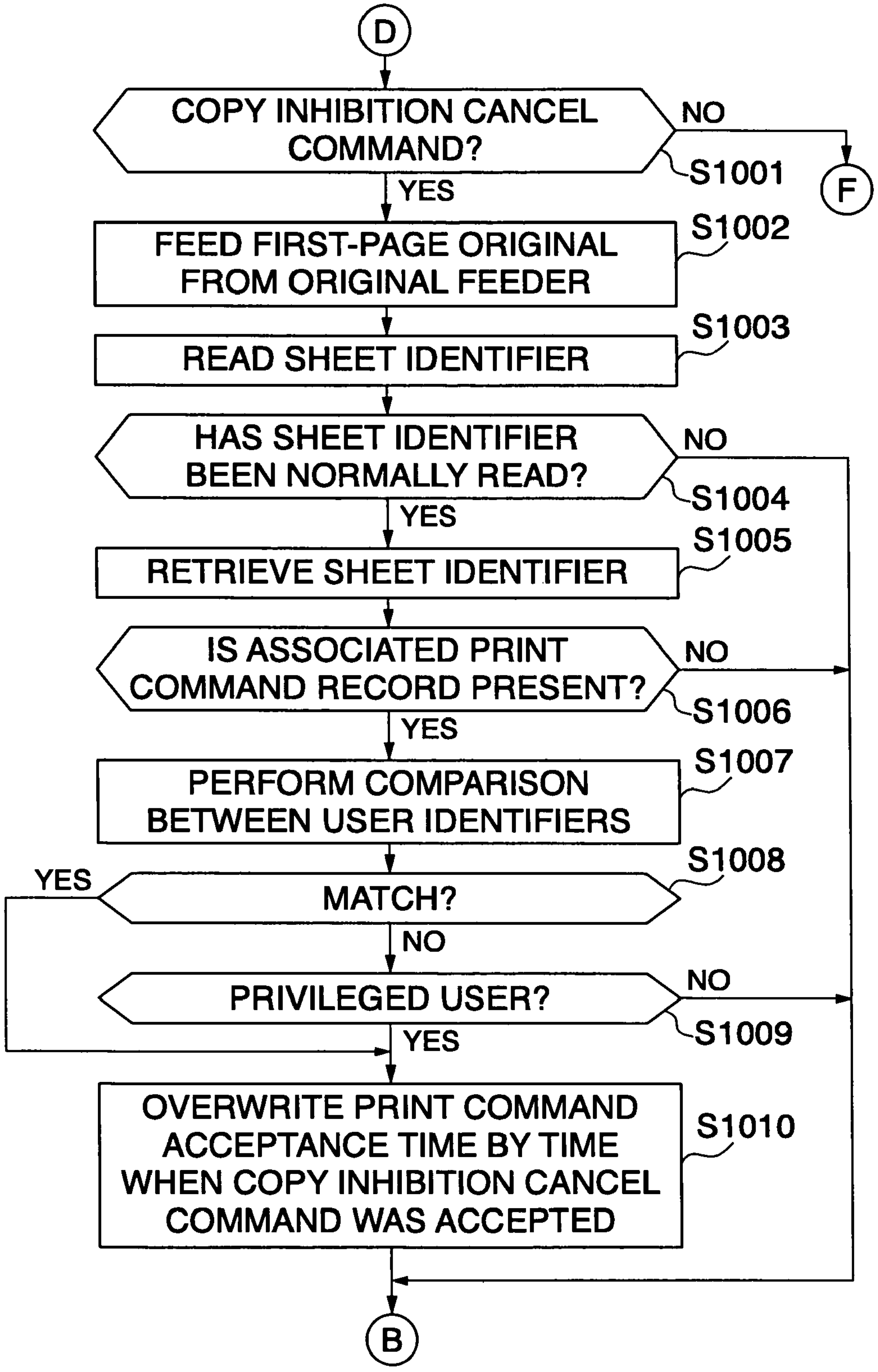
FIG. 11 is a continued part of the flowchart in FIG. 8.
Figure 12:
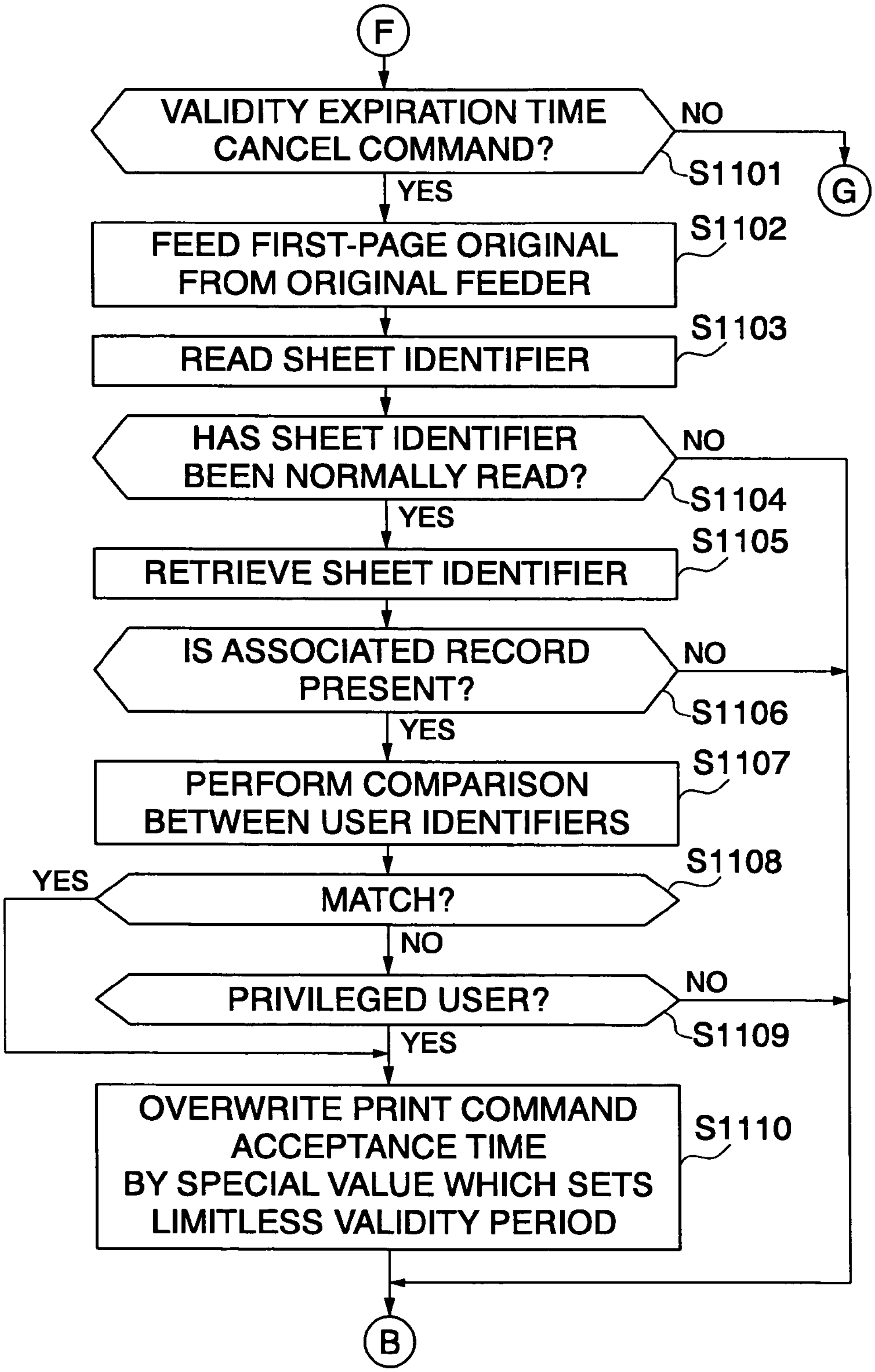
FIG. 12 is a continued part of the flowchart in FIG. 11.

More specifically, in a step S901 of a flowchart in FIG. 10, a time earlier by a predetermined time period (one day in the above example) than the copy command acceptance time recorded in the step S604 is calculated. In the following step S902, the calculated time is compared with the print command acceptance time 704 recorded in the print command record data. If the calculated time is later than the print command acceptance time 704, the process proceeds to a step S903, wherein the print command acceptance time 704 recorded in the print command record data is overwritten by the time calculated in the step S901. On the other hand, if it is determined in the step S902 that the calculated time is earlier than the print command acceptance time 704, the process is immediately terminated without rewriting the acceptance time, so as to avoid reduction of the original validity period of the printed document data.

If the operation command accepted in the step S603 is a copy inhibition cancel command (YES to step S1001 in FIG. 11), steps S1002 to S1009 are executed. A process in the steps S1002 to S1009 is basically the same as the process in the steps S802 to S806 and S810 to S812, and therefore a description will be briefly given of only different points.

When a copy inhibition cancel command is issued, it is possible to cancel the i-copy-inhibited state of document data whose i-copy validity period has expired to thereby practically inhibit the i-copy, under a predetermined condition.

More specifically, when the user who caused the MFP 200 to print the document data for i-copy (i.e. the document data printed on the sheet associated with the sheet identifier 702 read in a step S1003) in the step S610 or a privileged user has issued the copy inhibition cancel command, the CPU 301 overwrites the print command acceptance time 704 in the print command record data including the sheet identifier 702 acquired from the server apparatus in a step S1005 by a time when the copy inhibition cancel command was accepted, and sends the print command record data subjected to the rewriting process to the server apparatus to thereby cancel the practically i-copy-inhibited state of the document data (step S1010). Then, the server apparatus overwrites the corresponding record by the received print command record data.

Since the print command acceptance time 704 is overwritten, as described above, by the time when the copy inhibition cancel command was accepted, the i-copy of the printed document data associated with the sheet identifier 702 is enabled again over a predetermined time period from this time point. In the above example, rewriting is performed using the present time, and therefore a validity period after the cancellation of copy inhibition is set to a time period equal in length to the validity period before the cancellation of copy inhibition. However, it is possible to set the validity period after the cancellation of copy inhibition to a period shorter than the validity period before the cancellation of copy inhibition. In this case, the print command acceptance time 704 in the print command record data is overwritten by a time a predetermined time period earlier than the time when the copy inhibition cancel command was accepted.

When the sheet identifier 702 has not been normally read (NO to a step S1004), or when there is no entry of the read sheet identifier 702 in the print command record data list on the server apparatus (NO to a step S1006), or when a user other than the user who caused the MFP 200 to print the document data on the sheet associated with the sheet identifier 702 in the step S610 or other than a privileged user has issued the copy inhibition cancel command (NO to steps S1008 and S1009), the process proceeds to the step S612 without executing the i-copy inhibition canceling processing in the step S1010, to invalidate the successful user authentication. Further, when the i-copy inhibition canceling processing in the step S1010 has been executed as well, the process proceeds to the step S612, wherein the successful user authentication is invalidated. When the successful user authentication is invalidated in the step S612 without executing the i-copy inhibition canceling processing in the step S1010, error processing may be additionally executed e.g. to display a message indicative of a failure in the cancellation of i-copy inhibition and a reason for the failure.

If the operation command accepted in the step S603 is a validity expiration time cancel command (YES to a step S1101 in FIG. 12), steps 1102 to S1109 are executed. The process in the steps 1102 to S1109 is basically the same as the process in the steps S802 to S806 and S810 to S812, and therefore a description will be briefly given of only different points.

When the validity expiration time cancel command has been issued, it is possible to cancel the validity expiration time of document data whose validity expiration time for i-copy is practically set based on the associated print command acceptance time 704 or the like, under a predetermined condition.

More specifically, when the user who caused the MFP 200 to print the document data for i-copy (i.e. the document data printed on a sheet associated with the sheet identifier 702 read in a step S1103) in the step S610 or a privileged user has issued the copy inhibition cancel command, the CPU 301 overwrites the print command acceptance time 704 in the print command record data including the sheet identifier 702 acquired from the server apparatus in a step S1105 by a special value which sets a practically limitless validity period (e.g. a time 1000 years later than the present time), and sends the print command record data subjected to the rewriting process to the server apparatus to thereby cancel the i-copy validity period of the document data (step S1110). Then, the server apparatus overwrites the corresponding record by the received print command record data.

When the sheet identifier 702 has not been normally read (NO to a step S1104), or when there is no entry of the read sheet identifier 702 in the print command record data list on the server apparatus (NO to a step S1106), or when a user other than the user who caused the MFP 200 to print the document data on the sheet associated with the sheet identifier 702 in the step S610 or than a privileged user has issued the validity expiration time cancel command (NO to steps S1108 and S1109), the process proceeds to the step S612 without executing the i-copy validity expiration time canceling processing in the step S1110, to invalidate the successful user authentication. When the i-copy validity expiration time canceling processing in the step S1110 is executed as well, the process proceeds to the step S612, wherein the successful user authentication is invalidated. When the successful user authentication is invalidated in the step S612 without executing the i-copy validity expiration time canceling processing in the step S1110, error processing may be additionally executed e.g. to display a message indicative of a failure in the cancellation of the i-copy validity expiration time and a reason for the failure.

Figure 13:
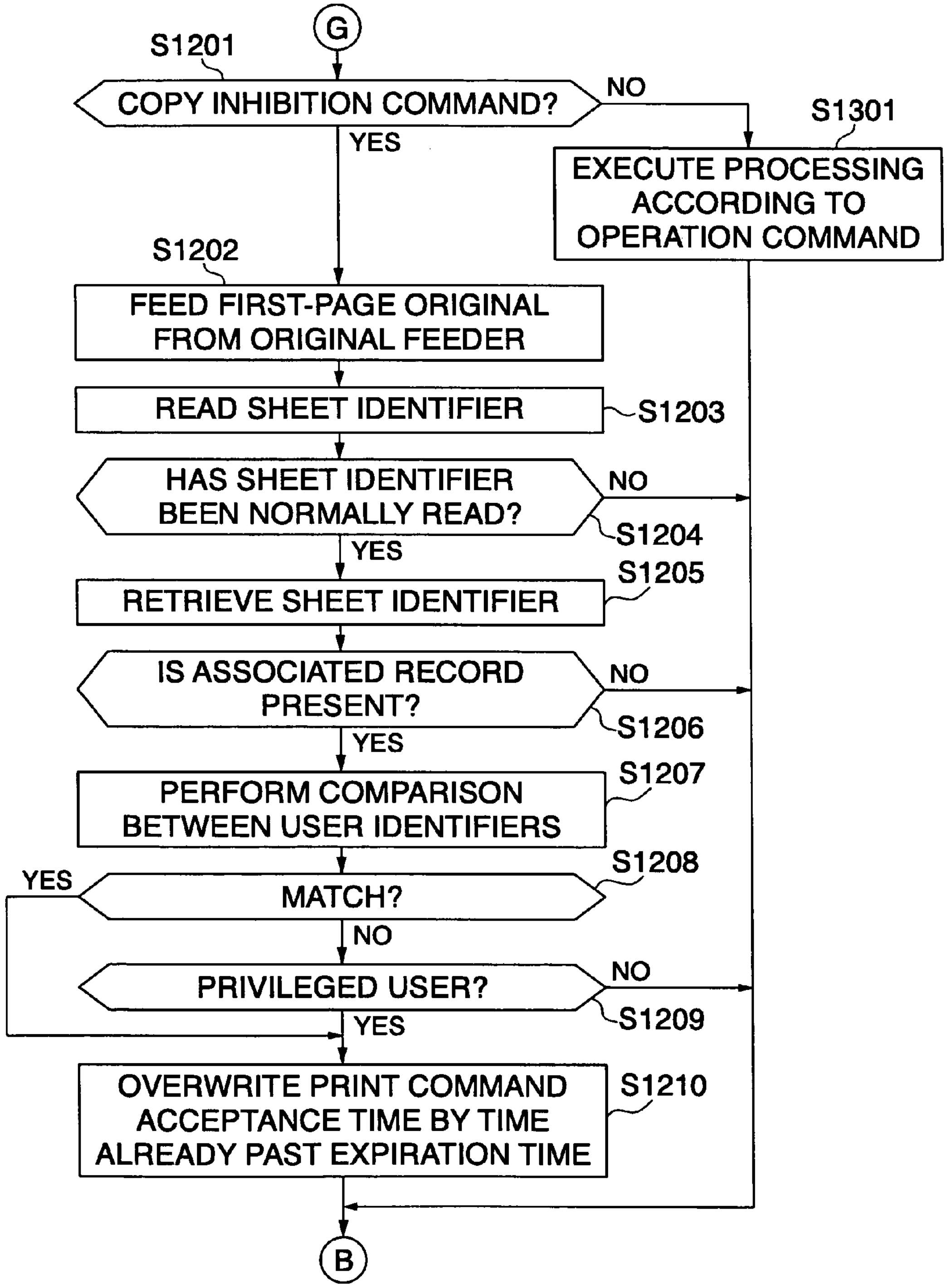
FIG. 13 is a continued part of the flowchart in FIG. 12.

If the operation command accepted in the step S603 is a copy inhibition command, a process shown in FIG. 13 is executed. A process in steps 1202 to S1209 in FIG. 13 is basically the same as the process in the steps S802 to S806 and S810 to S812, and therefore a description will be briefly given of only different points.

When a copy inhibition command has been issued (YES to a step S1201), it is possible to inhibit the i-copy of document data whose validity expiration time for i-copy is practically set based on the associated print command acceptance time 704 or the like, under a predetermined condition.

More specifically, when the user who caused the MFP 200 to print the document data for i-copy (i.e. the document data printed on a sheet associated with the sheet identifier 702 read in a step S1203) in the step S610 or a privileged user has issued the copy inhibition command, the CPU 301 overwrites the print command acceptance time 704 in the print command record data including the sheet identifier 702 acquired from the server apparatus in a step S1205 by a time which defines an expired i-copy validity period (step S1210).

For example, when the validity period set in the system is two days, the print command acceptance time 704 is overwritten by a time more than two days earlier than the present time. After execution of this rewriting process, since the print command acceptance time in the print command record data is set to the time more than two days earlier than the present time, even if the user attempts to perform i-copy of the document data, it is determined in the step S809 in FIG. 8 that the validity period has expired. As a result, the user is inhibited from performing the i-copy unless he/she is the user who caused the MFP 200 to print the document data for i-copy or a privileged user.

When the sheet identifier 702 has not been normally read (NO to a step S1204), or when there is no entry of the read sheet identifier 702 in the print command record data list on the server apparatus (NO to a step S1206), or when a user other than the user who caused the MFP 200 to print the document data on the sheet associated with the sheet identifier 702 in the step S610 or than a privileged user has issued the validity expiration time cancel command (NO to steps S1208 and S1209), the process proceeds to the step S612 without executing the i-copy inhibiting processing in the step S1210, to invalidate the successful user authentication. When the i-copy inhibiting processing in the step S1210 has been executed as well, the process proceeds to the step S612, wherein the successful user authentication is invalidated. When the successful user authentication is invalidated in the step S612 without executing the i-copy inhibiting processing in the step S1210, error processing may be additionally executed e.g. to display a message indicative of a failure in the inhibition of i-copy and a reason for the failure.

When it is determined in the step S1201 that the issued operation command is not a copy inhibition command, i.e. when a command other than the end command, the print command, the copy inhibition cancel command, the validity expiration time cancel command is issued, processing is executed in response to the issued command (step S1301), and the process proceeds to the step S612, wherein the successful user authentication is invalidated.

As described above, according to the present embodiment, not only is the user authentication performed, but also the i-copy validity period is set in association with each document data file for i-copy. This enhances security for document data for i-copy. Further, a user who caused a MFP to print document data for i-copy in the step S610 and privileged users including an administrator are allowed to change the print command acceptance time 704 in the print command record data 701 to thereby extend the i-copy validity period, reinstate the validity period which has already expired, eliminate the expiration time of the validity period, or immediately inhibit the i-copy, so that it is possible to enhance security for the document data for i-copy and maintain the convenience of i-copy at the same time.

Although in the example described above, the validity period of each document data file for i-copy is managed based on the print command acceptance time 704, it is also possible to manage the i-copy validity period based on a print start time or a print end time, or a time when a printed print sheet is removed from a sheet discharge tray, or a time when an original print sheet for i-copy is removed from the original feeder. In the case of managing the i-copy validity period based on the times when a printed or original print sheet is removed, it may be configured such that the RFID reader and writer 317 of the printer section 202 or the RFID reader and writer 412 of the image reader section 201 repeatedly reads the sheet identifier 702 (sheet identifier 702 read in the steps S606, S803 and S1003) from the RFID tag on the print sheet, and a time when the sheet identifier 702 cannot be read any longer is set to the time when the print sheet was removed.

Next, a description will be given of an image forming process according to a second embodiment of the present invention. This image forming process is executed by the MFP 200.

As is distinct from the image forming process according to the first embodiment described above, in which the sheet identifier recorded in advance on the RFID tag attached to a print sheet is used for the sheet identifier 702 to be recorded as a part of print command record data, in the image forming process according to the second embodiment, the MFP 200 generates a sheet identifier (GUID, referred to hereinafter), and the GUID is printed on a first page of document data for i-copy. More specifically, in the image forming process according to the second embodiment, the CPU 301 executes steps S1409 and S1410 in FIG. 14 in place of the step S609 in FIG. 6. In the step S1409, an identifier GUID (Global Unique Identifier) which is uniquely identifiable and does not match any other sheet identifier in any case is generated as the sheet identifier 702. The GUID as the sheet identifier 702 is assumed to be printable as print data on a sheet surface.

Then, the CPU 301 attaches the GUID generated in the step S1409 to document data prepared for printing in the step S1408 so as to make it possible to carry out i-copy using the printed sheet after execution of the print process (step S1410). In this GUID attaching processing, a character string or a bar code may be disposed as the GUID e.g. in the periphery of the document data, or embedded in the document data by a technique called digital watermarking or electronic watermarking.

Next, the CPU 301 carries out printing in a step S1411. In this print processing, the identifier GUID is printed on the first-page of a print document. When a print sheet printed with an identifier GUID is used for i-copy, the identifier GUID is read by the normal reading function of the image reader section 201.

The other parts of the image forming process according to the present embodiment are executed similarly to the corresponding parts in the image forming process according to the first embodiment shown in FIGS. 6 and 8 to 13, and therefore description thereof is omitted. Since no sheets with the RFID tag attached thereto are used in the present image forming process, the hardware configuration of the MFP 200 for executing the second image forming process can dispense with the RFID reader and writer 317 of the printer section 202 and the RFID reader and writer 412 of the image reader section 201.

As described above, according to the second embodiment, the identifier GUID can be generated by the MFP 200, so that even when a print sheet with the sheet identifier 702 attached thereto is not available, it is possible to execute a process similar to the first embodiment, using an ordinary sheet, and obtain the same advantageous effects as provided by the first embodiment. In other words, since the second embodiment need not use a sheet with the RFID tag or the RFID reader and writer 317 or 412, the same advantageous effects as provided by the first embodiment can be obtained at a lower cost.

Next, a description will be given of an image forming process according to a third embodiment of the present invention. This image forming process is executed by the MFP 200.

As is distinct from the image forming process according to the second embodiment, in which it is assumed that a sheet with the sheet identifier 702 is not available, in the image forming process according to the third embodiment, both a case where a sheet with the sheet identifier 702 is available and a case where a sheet with the sheet identifier 702 is not available are anticipated. The sheet identifier 702 is assumed to be printable as print data on a sheet surface. The image forming process according to the third embodiment is substantially identical in the other respects to the image forming process according to the second embodiment, and therefore a description will be given of only different points from the image forming process according to the second embodiment.

Figure 14:
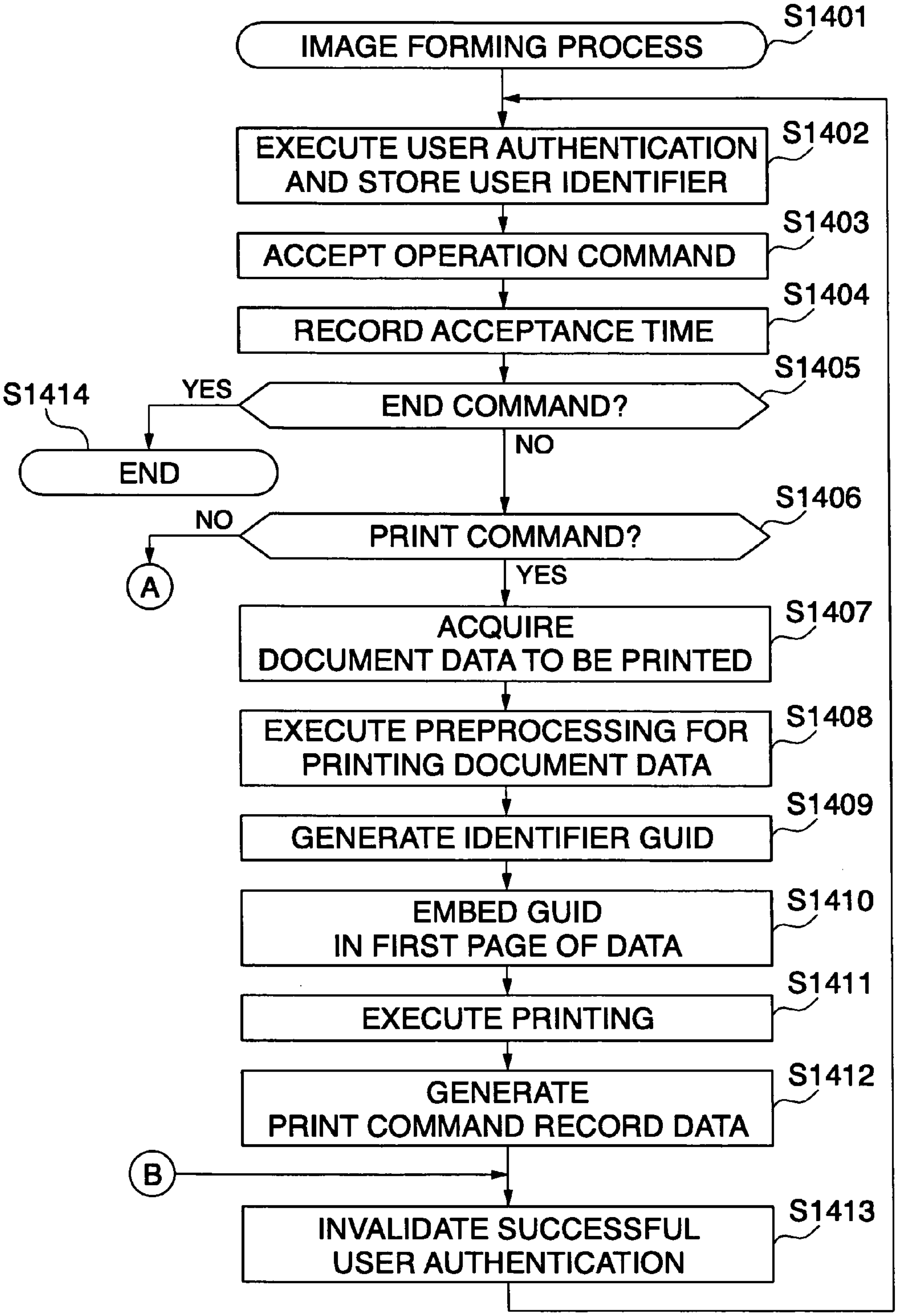
FIG. 14 is a flowchart of an image forming process (process relating to a print command) according to a second embodiment of the present invention.
Figure 15:
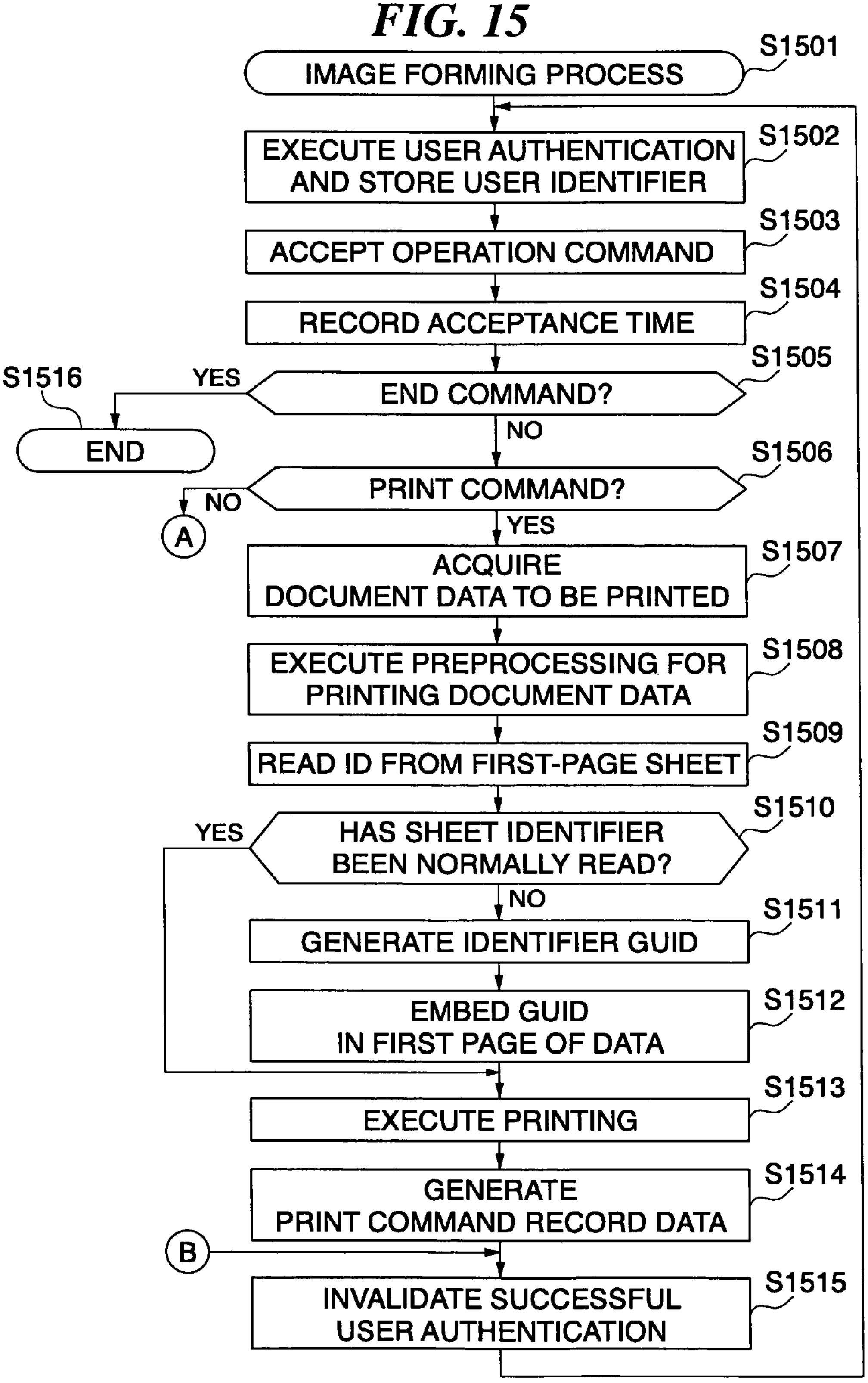
FIG. 15 is a flowchart of an image forming process (process relating to a print command) according to a third embodiment of the present invention.

In the image forming process according to the third embodiment, in steps S1501 to S1508, the CPU 301 executes the same process as executed in the steps S1401 to S1408 in FIG. 14 in the image forming process according to the second embodiment, and then causes a first-page print sheet to be picked up and fed from the sheet cassette 225 or 224, followed by attempting to read the sheet identifier 702 from the print sheet (step S1509). When the CPU 301 has successfully read the sheet identifier 702 (YES to a step S1510), the process proceeds to a step S1513, wherein the CPU 301 executes print processing.

On the other hand, when having failed in reading the sheet identifier 702 (NO to the step S1510), the CPU 301 generates a GUID as the sheet identifier 702 (step S1511). Then, to enable the i-copy to be performed using the print sheet after execution of print processing, the CPU 301 attaches the GUID generated in the step S1511 to the document data prepared for printing in the step S1508 (step S1512). In this GUID attaching processing, a pattern may be disposed as the GUID e.g. in the periphery of the document data, or embedded in the document data by the digital watermarking technique. Next, the CPU 301 executes print processing in the step S1513. In this print processing, the identifier GUID is attached to the first-page of the print document.

The third embodiment makes it possible to perform the i-copy using either of a print sheet with the sheet identifier 702 and an ordinary print sheet without the sheet identifier.

Next, a description will be given of an image forming process according to a fourth embodiment of the present invention. This image forming process is executed by the MFP 200.

As is distinct from the image forming process according to the second embodiment, in which the GUID generated by the MFP is attached to a print sheet by print processing, in the image forming process according to the fourth embodiment, the GUID generated by the MFP 200 is written into the RFID tag attached in advance to a print sheet. The image forming process according to the fourth embodiment is almost the same as the image forming process according to the second embodiment, and therefore a description will be briefly given of only different points from the second image forming process.

Figure 16:
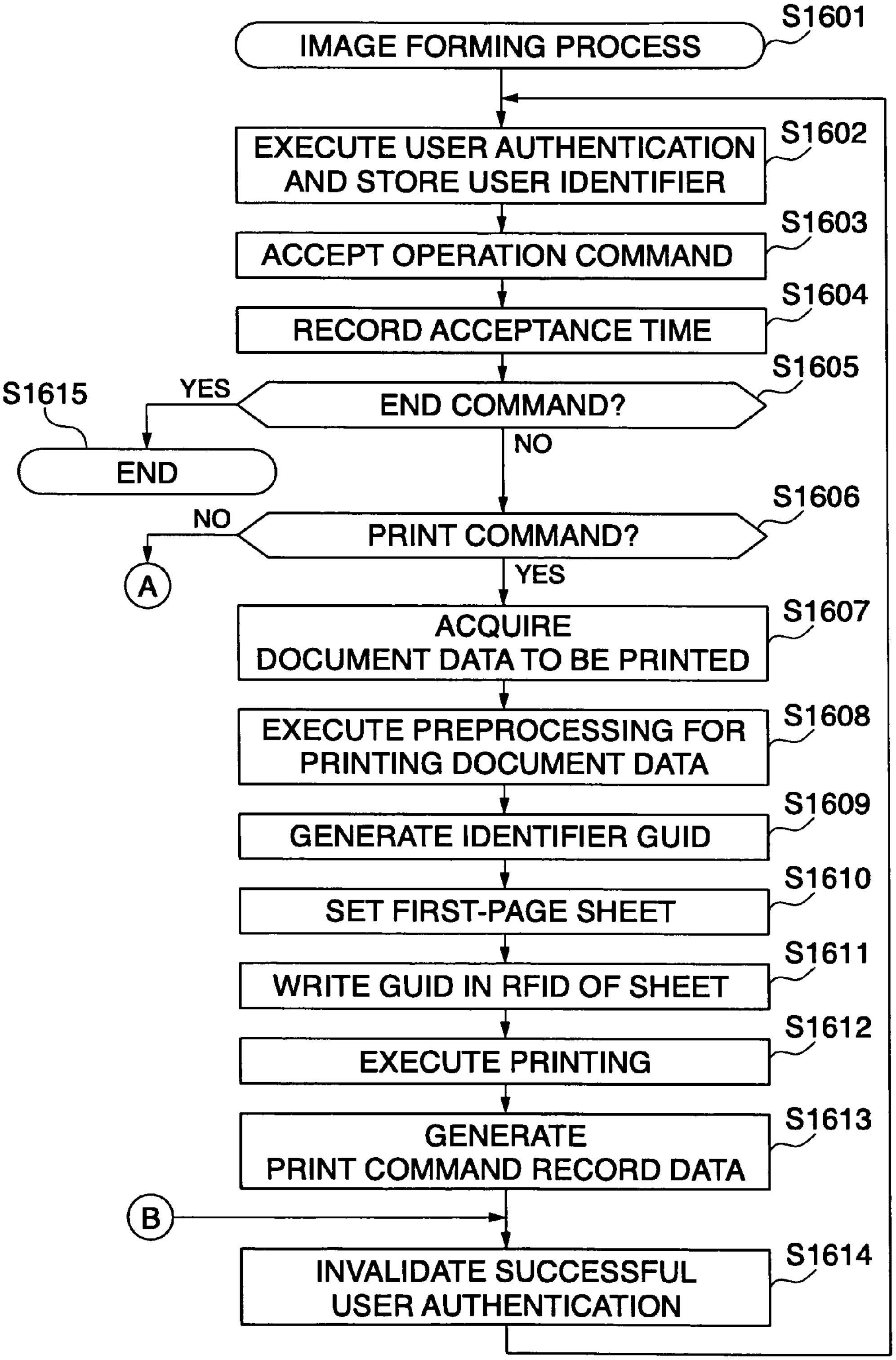
FIG. 16 is a flowchart of an image forming process (process relating to a print command) according to a fourth embodiment of the present invention.

In the image forming process according to the fourth embodiment, in steps S1601 to S1609 in FIG. 16, the CPU 301 executes the same process as executed in the steps S1401 to S1409 in FIG. 14 in the image forming process according to the second embodiment, and then causes a sheet with the RFID tag, as a first-page print sheet, to be picked up and fed from the sheet cassette 225 in a step S1610. Next, the CPU 301 causes the RFID reader and writer 317 to write the GUID generated in the step S1609 into the RFID tag on the print sheet (step S1611).

As described above, according to the fourth embodiment, even when a sheet with the RFID tag having no sheet identifier written therein is used, it is possible to manage the i-copy validity period as in the first to third embodiments. In other words, in the fourth embodiment, it is not necessary to write the sheet identifier in advance in the RFID tag on a print sheet as in the first embodiment, so that convenience for a user can be further enhanced than in the first embodiment.

Next, a description will be given of an image forming process according to a fifth embodiment of the present invention. This image forming process is executed by the MFP 200.

As is distinct from the image forming processes according to the first to fourth embodiments, in which the validity period of i-copy of document data is managed based on the associated print command acceptance time 704, in the image forming process according to the fifth embodiment, the i-copy validity period is managed using a downcounter. More specifically, as shown in FIG. 18A, print command record data 1801 in the present image forming process is comprised of data items of a sheet identifier 1802, a user identifier 1803, a document data identifier 1804, and a counter value 1805. Further, the present image forming process uses the sheet identifier 1802 written in advance in the RFID tag attached to a sheet, similarly to the image forming process according to the first embodiment.

The image forming process according to the fifth embodiment is executed by steps in a flowchart shown in FIGS. 17 and 19 to 24. The present image forming process is basically the same as the first image forming process described with reference to FIGS. 6, 8, 9, and 11 to 13, and therefore a description will be briefly given of only different points from the image forming process according to the first embodiment.

Figure 17:
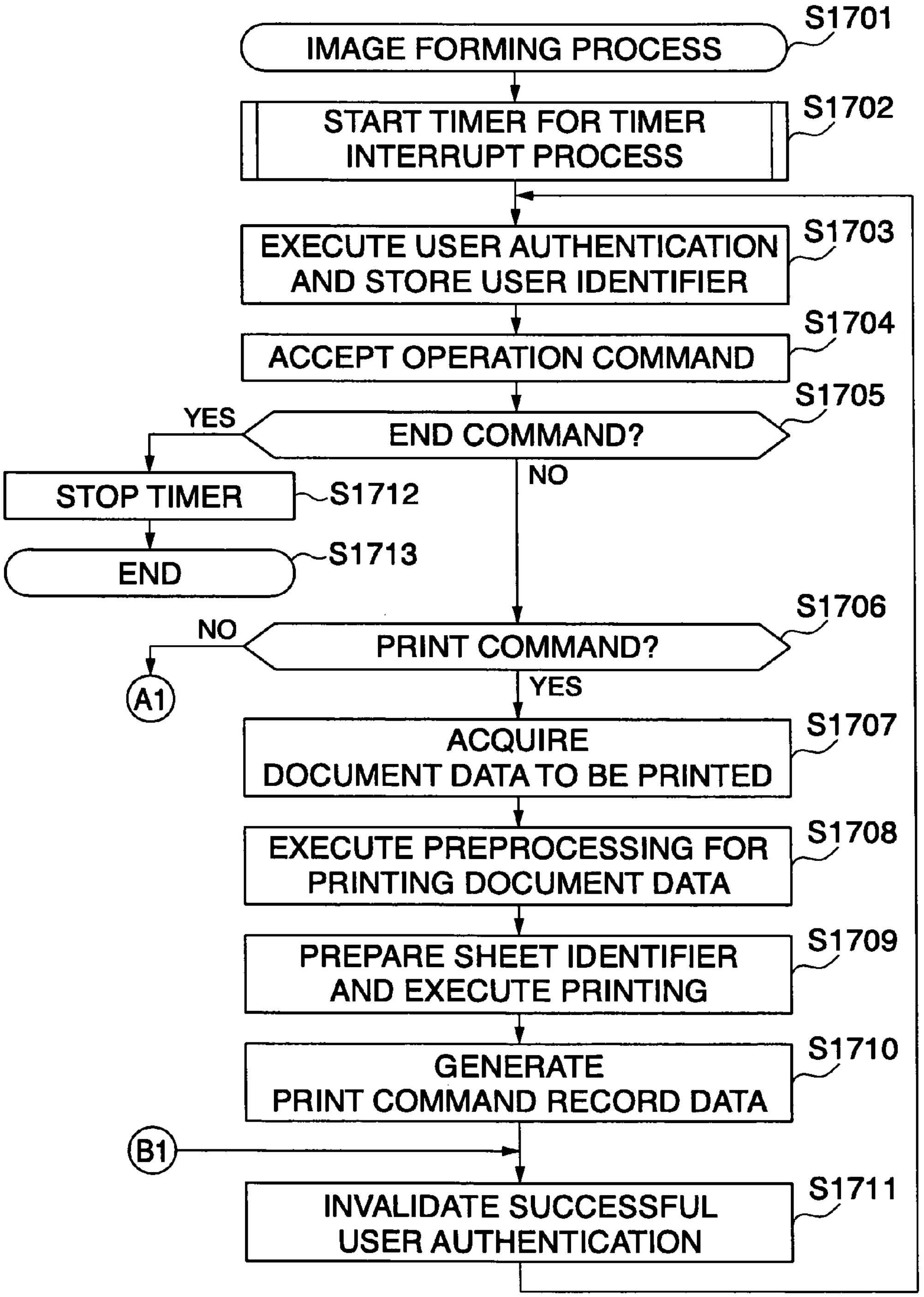
FIG. 17 is a flowchart of an image forming process (process relating to a print command) according to a fifth embodiment of the present invention.
Figure 19:
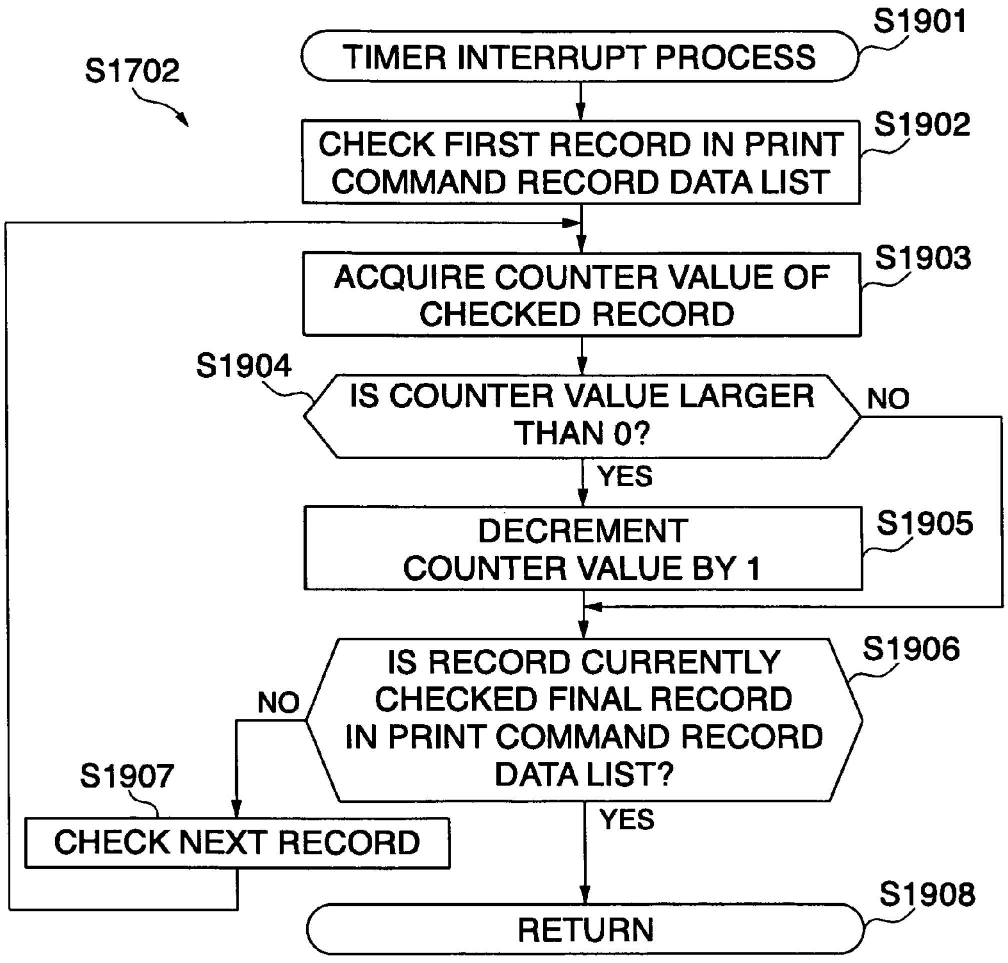
FIG. 19 is a flowchart showing details of a timer interrupt process executed according to a timer started in a step S1702 in FIG. 17.

In a step S1702 in FIG. 17, the CPU 301 sets a jump destination of a timer interrupt process and starts the timer. This timer interrupt process will be described in detail hereinafter with reference to FIG. 19. The timer is used for counting a predetermined time period e.g. of 30 minutes and generates an interrupt signal whenever the predetermined time period has been counted. The CPU 301 executes the timer interrupt process in FIG. 19 whenever the interrupt signal is generated. When the timer for counting 30 minutes is used in the case where the i-copy validity period is set e.g. to two days, the initial value of the counter value 1805 in the print command record data 1801 shown in FIG. 18A is set to “96”.

When the issued operation command is an end command (YES to a step S1705), the CPU 301 stops the timer started in the step S1702 (step S1712), followed by terminating the present process.

When the timer interrupt occurs during execution of the present process, the CPU 301 acquires a print command record data list 1810 (see FIG. 18B) from the server apparatus after saving all contexts for execution of a program then being executed in the RAM 302, and focuses on or checks a first record in the list 1810, i.e. print command record data 1811 in the illustrated example (step S1902). Then, the CPU 301 fetches a counter value 1805 from the record (step S1903), and determines whether or not the counter value 1805 is larger than “0” (step S1904). If the counter value 1805 is larger than “0” (which means that the i-copy validity period of the data has not expired), the CPU 301 decrements the counter value by “1” (step S1905), followed by the process proceeding to a step S1906. On the other hand, if the counter value 1805 is not larger than “0” (which means that the i-copy validity period has expired), the step S1905 is skipped over to the step S1906.

In the step S1906, the CPU 301 determines whether or not the record currently checked by the CPU 301 is a final one in the print command record data list 1810. If the record is not the final one, the CPU 301 focuses on or checks the following record (step S1907), and the process returns to the step S1903, whereafter the same process as described above is performed on the record. If the record is the final one in the print command record data list 1810, the present interrupt process is terminated.

In this way, the counter value 1805 of each record is decremented whenever the timer interrupt occurs, and becomes equal to "0" when the timer interrupt has occurred an initially set number of times. At this time point, the i-copy validity period of document data associated with the record expires.

In a copy command-related process (FIG. 20) of the present process following a step S1706 in FIG. 17, as is distinct from the image forming process according to the first embodiment (see steps S807 to S809 in FIG. 8), it is determined in a step S2007 whether or not the counter value 1805 in the print command record data associated with the read sheet identifier 1802 is larger than "0" to thereby determine whether the i-copy validity period of document data associated with the sheet identifier 1802 has expired.

Figure 20:
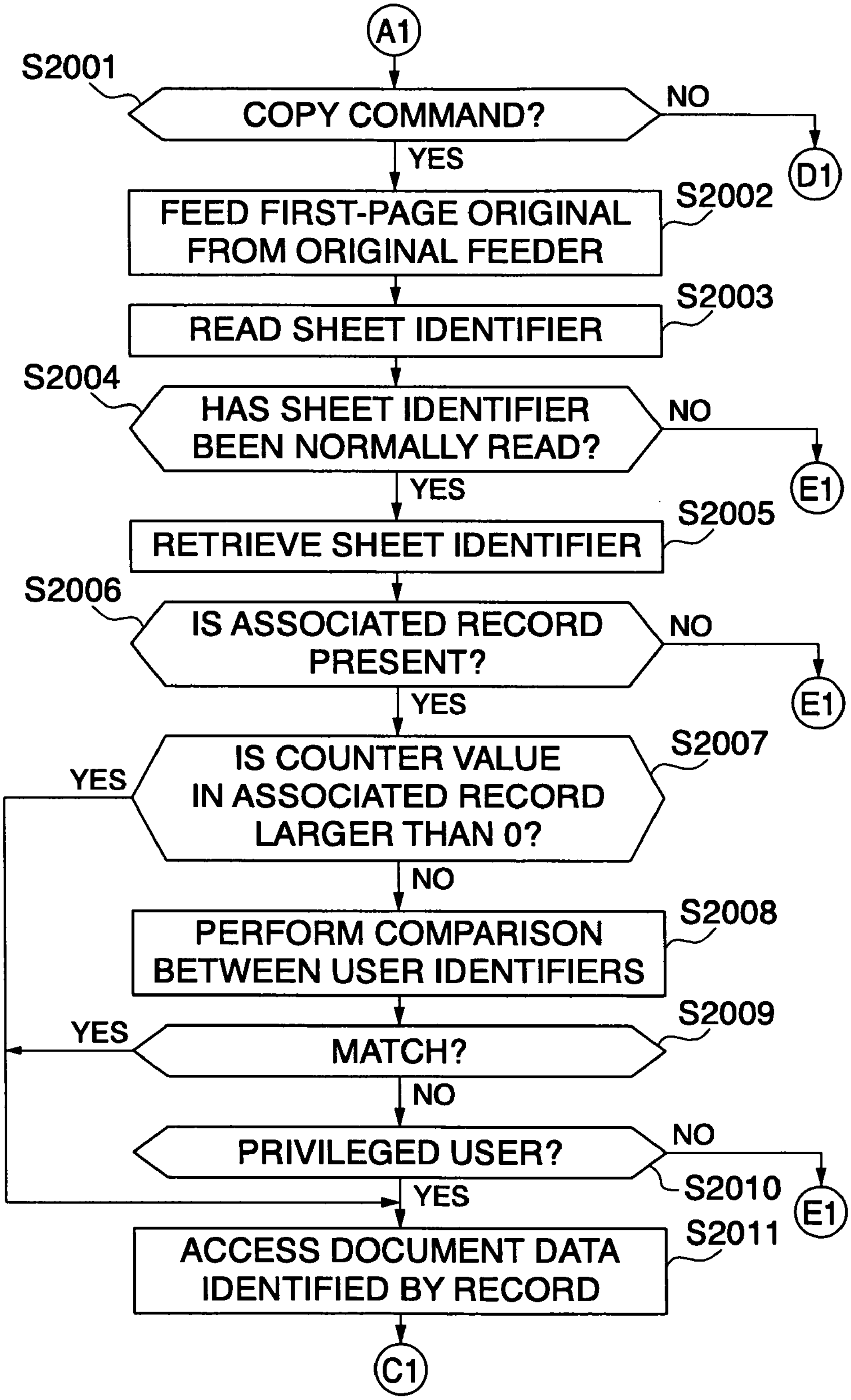
FIG. 20 is a continued part of the flowchart in FIG. 17.
Figure 21:
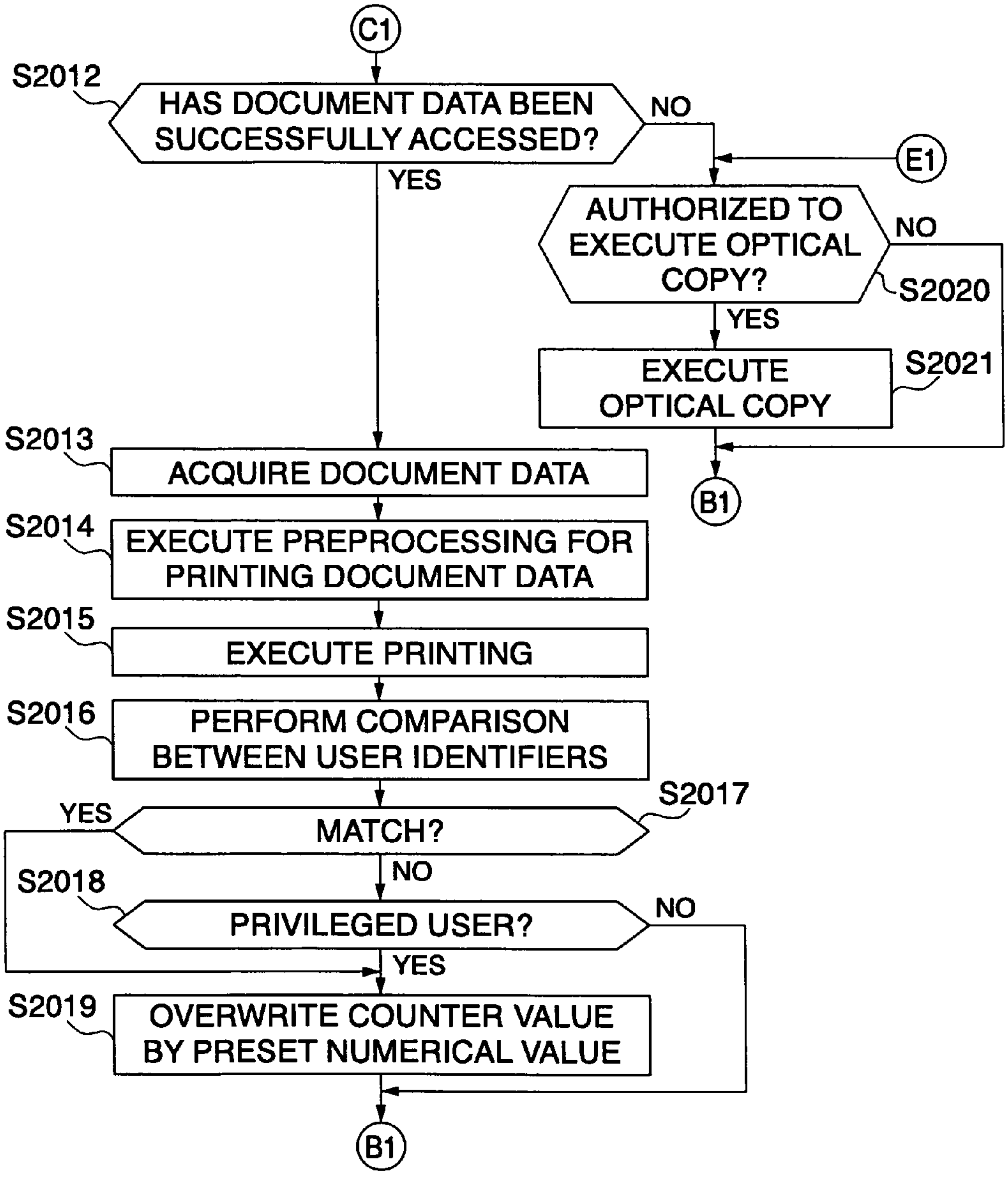
FIG. 21 is a continued part of the flowchart in FIG. 20.

Further, in a validity period resetting process (FIG. 21) of the present process following a step S2011 in FIG. 20, as is distinct from the image forming process according to the first embodiment (see a step S821 in FIG. 9, and FIG. 10), the counter value 1805 in the print command record data associated with the read sheet identifier 1802 is overwritten by the above-mentioned initial value in a step S2019.

Furthermore, in a copy inhibition canceling process (FIG. 22) of the present process following a step S2001 in FIG. 20, as is distinct from the image forming process according to the first embodiment (see step S1010 in FIG. 11), the counter value 1805 in the print command record data associated with the read sheet identifier 1802 is overwritten by the above-mentioned initial value in a step S2110.

Figure 22:
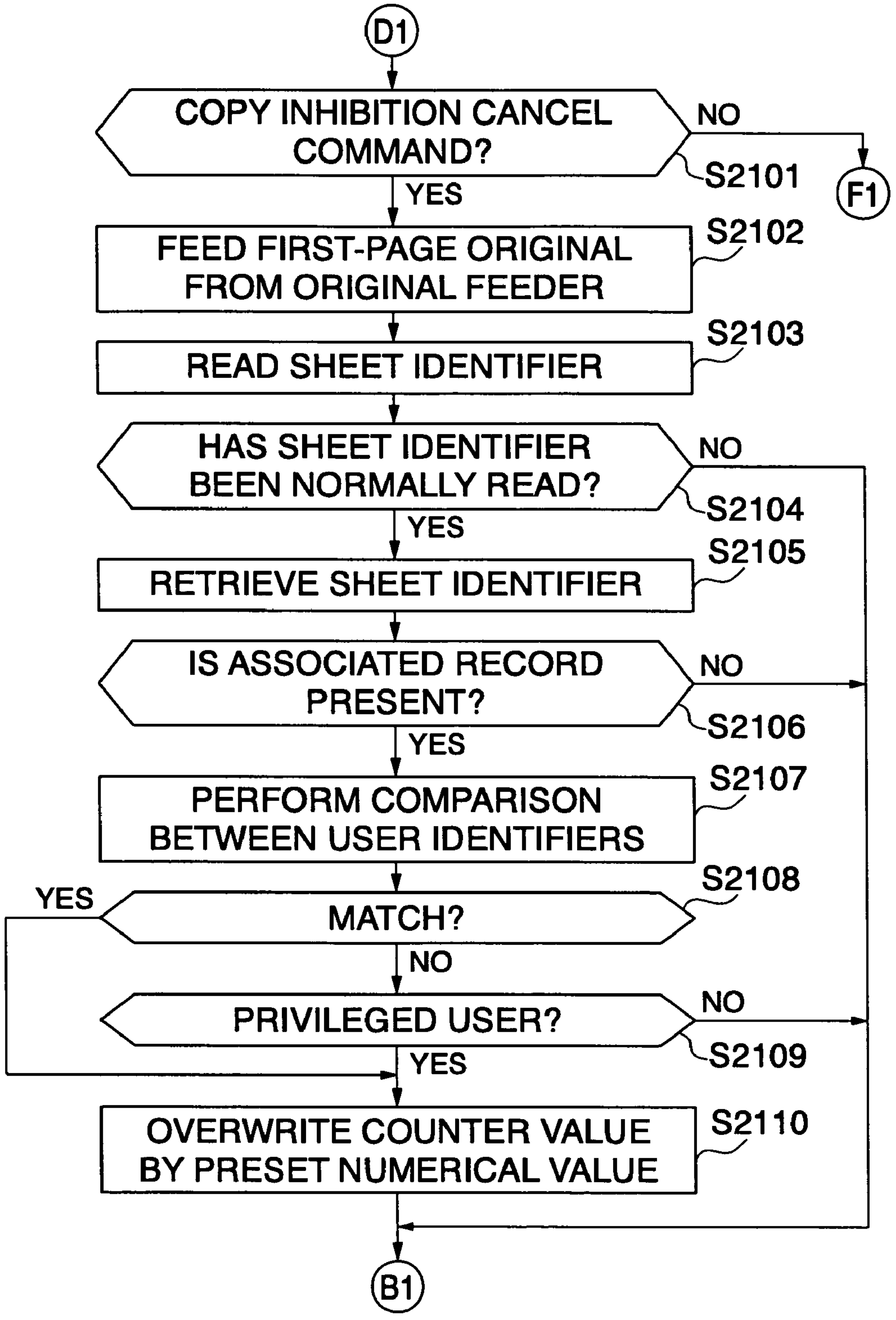
FIG. 22 is a continued part of the flowchart in FIG. 20.

Moreover, in a validity expiration time canceling process (FIG. 23) of the present process following a step S2101 in FIG. 22, as is distinct from the image forming process according to the first embodiment (see step S1110 in FIG. 12), the counter value 1805 in the print command record data associated with the read sheet identifier 1802 is overwritten by a predetermined value which sets a practically limitless validity period, in a step S2210.

Figure 23:
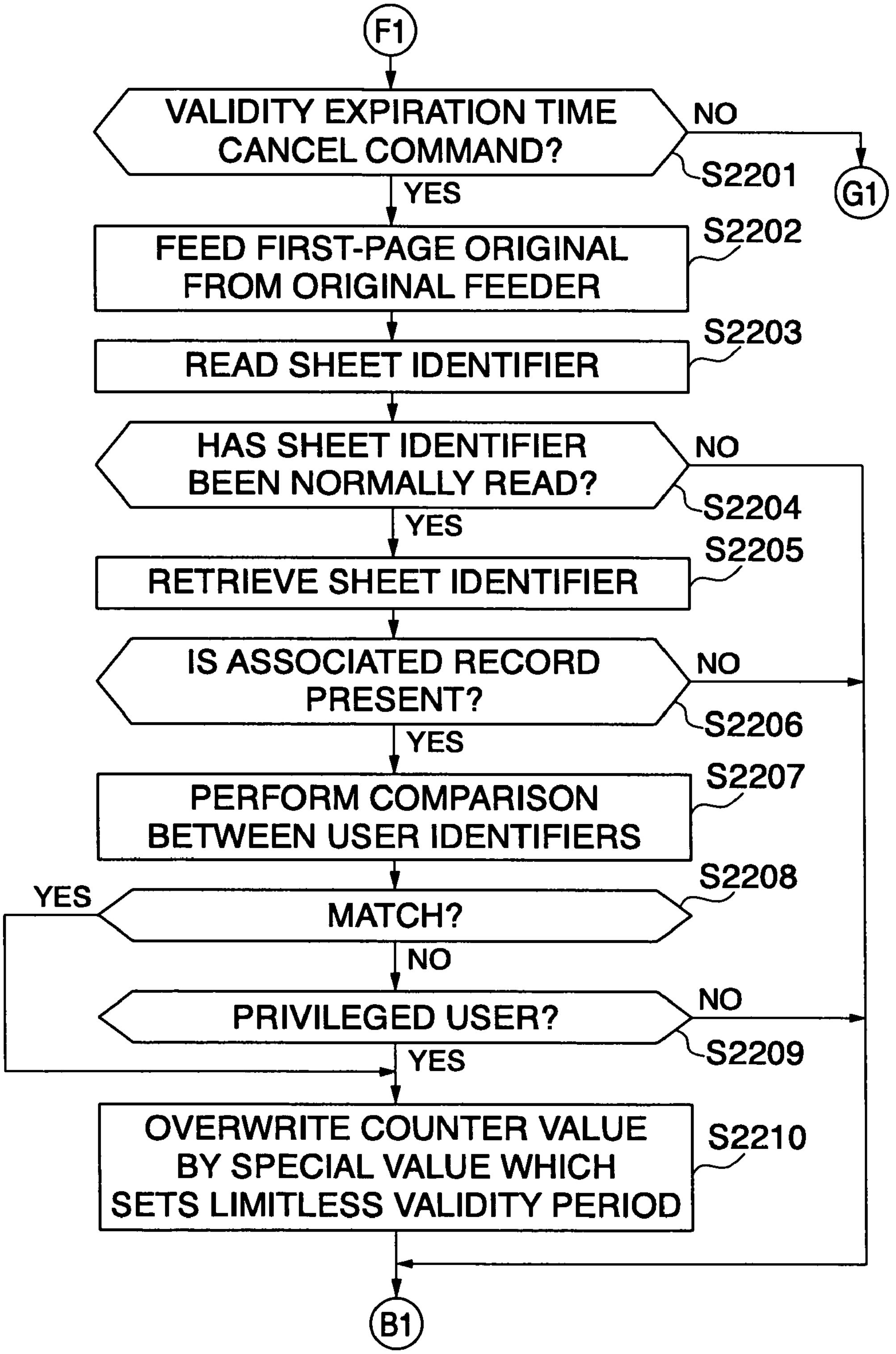
FIG. 23 is a continued part of the flowchart in FIG. 22.
Figure 24:
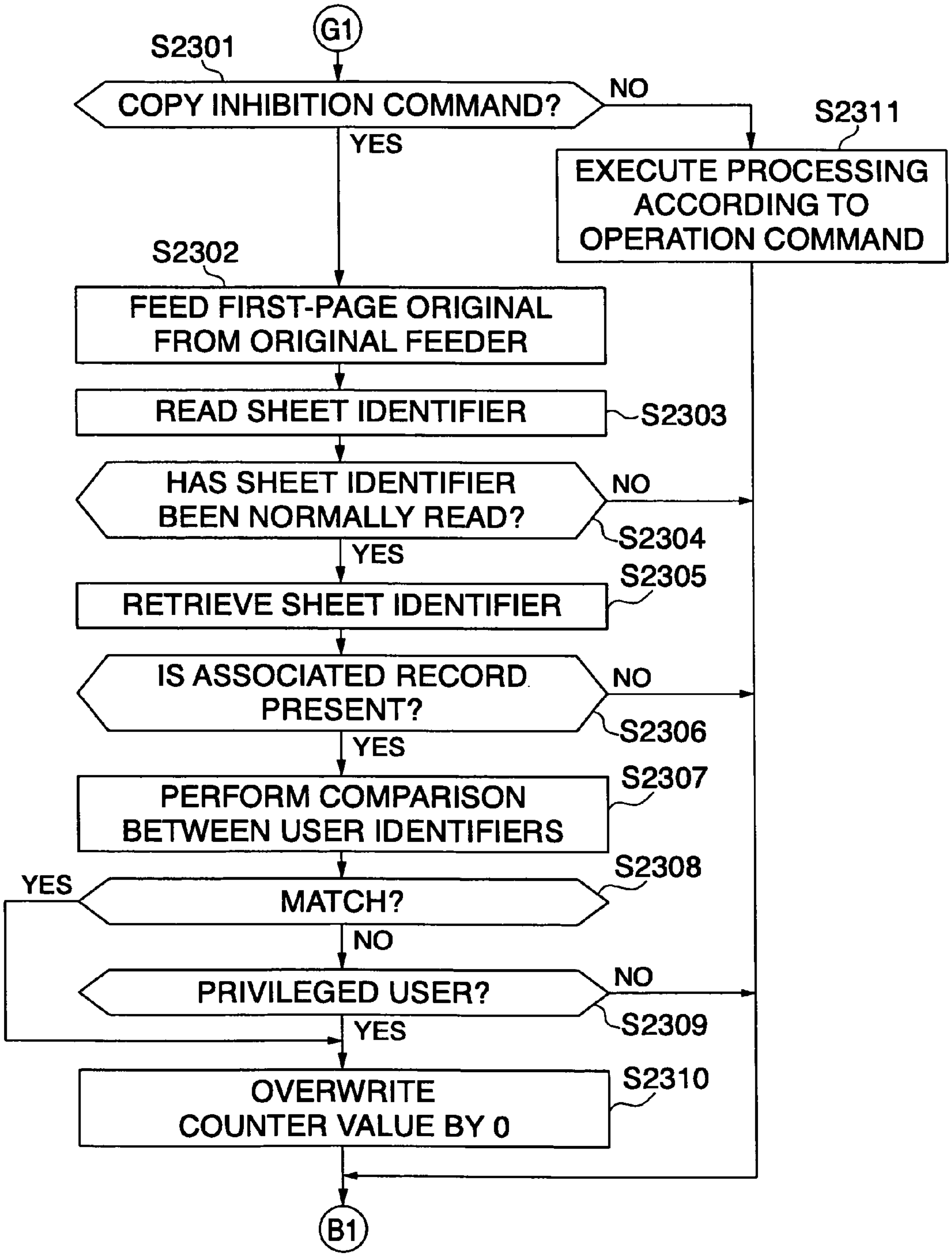
FIG. 24 is a continued part of the flowchart in FIG. 23.
Figure 25:
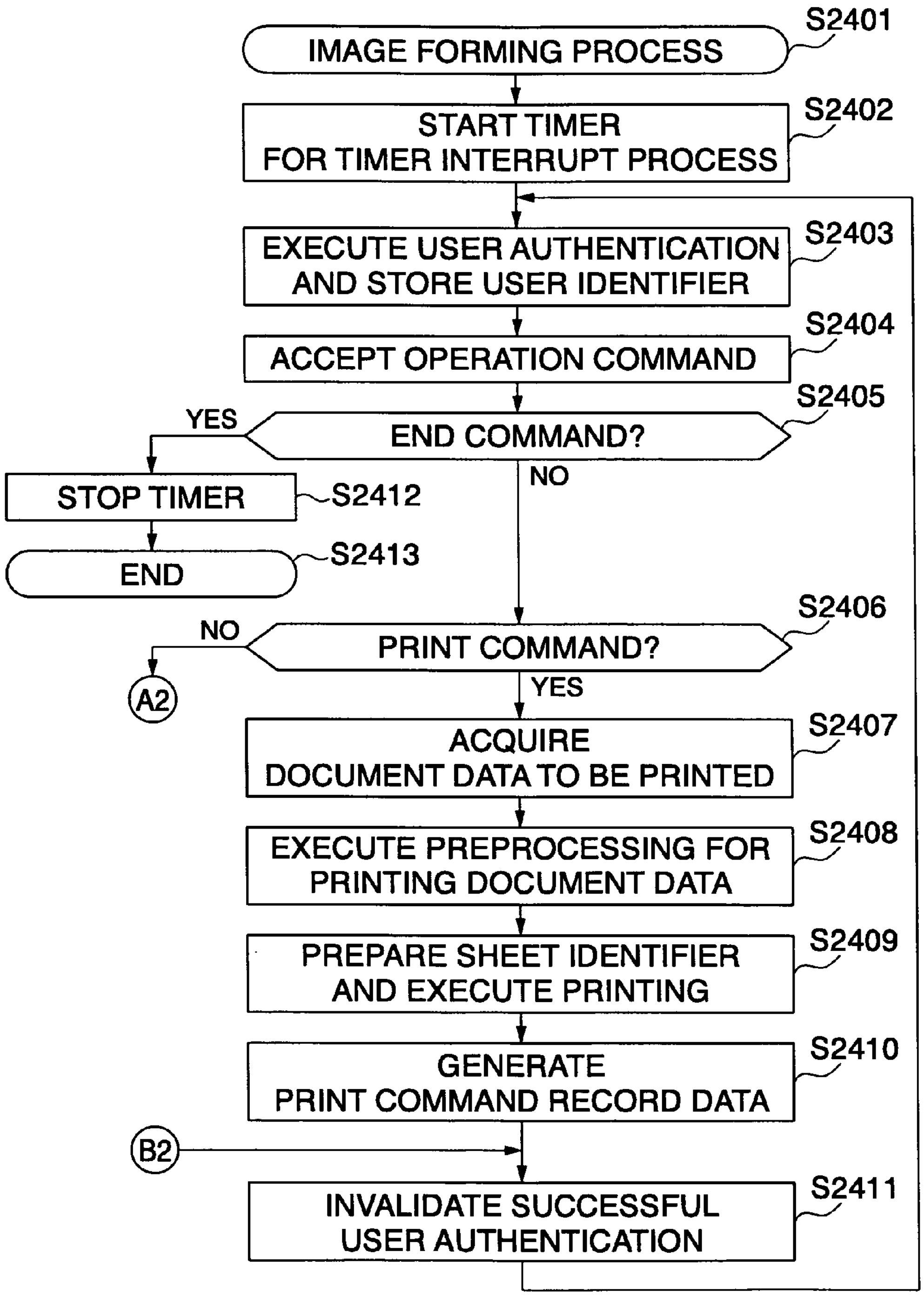
FIG. 25 is a flowchart of an image forming process (process relating to a print command) according to a sixth embodiment of the present invention.

Finally, in a copy inhibiting process (FIG. 24) of the present process following a step S2201 in FIG. 23, as is distinct from the first image forming process (see step S1210 in FIG. 13), the counter value 1805 in the print command record data associated with the read sheet identifier 1802 is overwritten by "0" in a step S2310.

As described above, according to the fifth embodiment, it is possible to manage the i-copy validity period using the downcounter in place of the print command acceptance time 704.

Next, a description will be given of an image forming process according to a sixth embodiment of the present invention. This image forming process is executed by the MFP 200.

Figure 26:
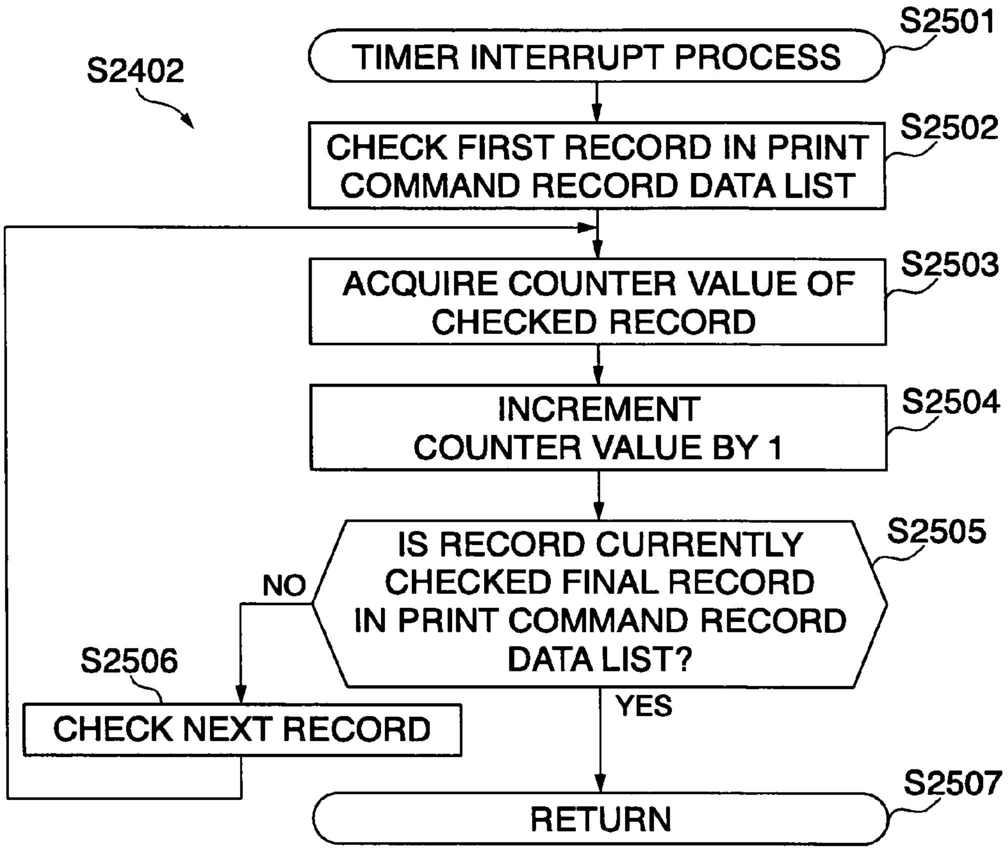
FIG. 26 is a flowchart showing details of a timer interrupt process executed according to a timer started in a step S2402 in FIG. 25.
Figure 27:
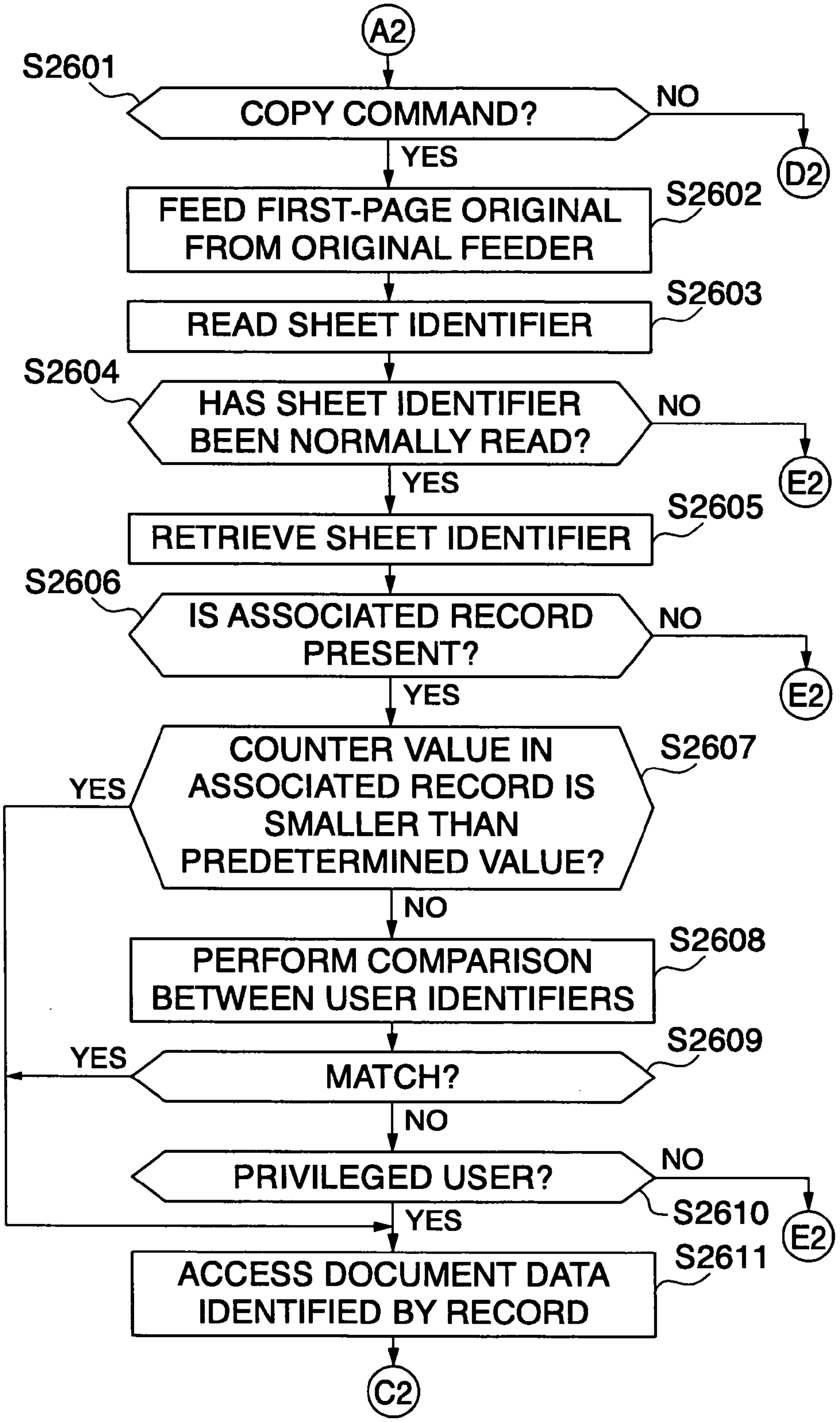
FIG. 27 is a continued part of the flowchart in FIG. 25.
Figure 28:
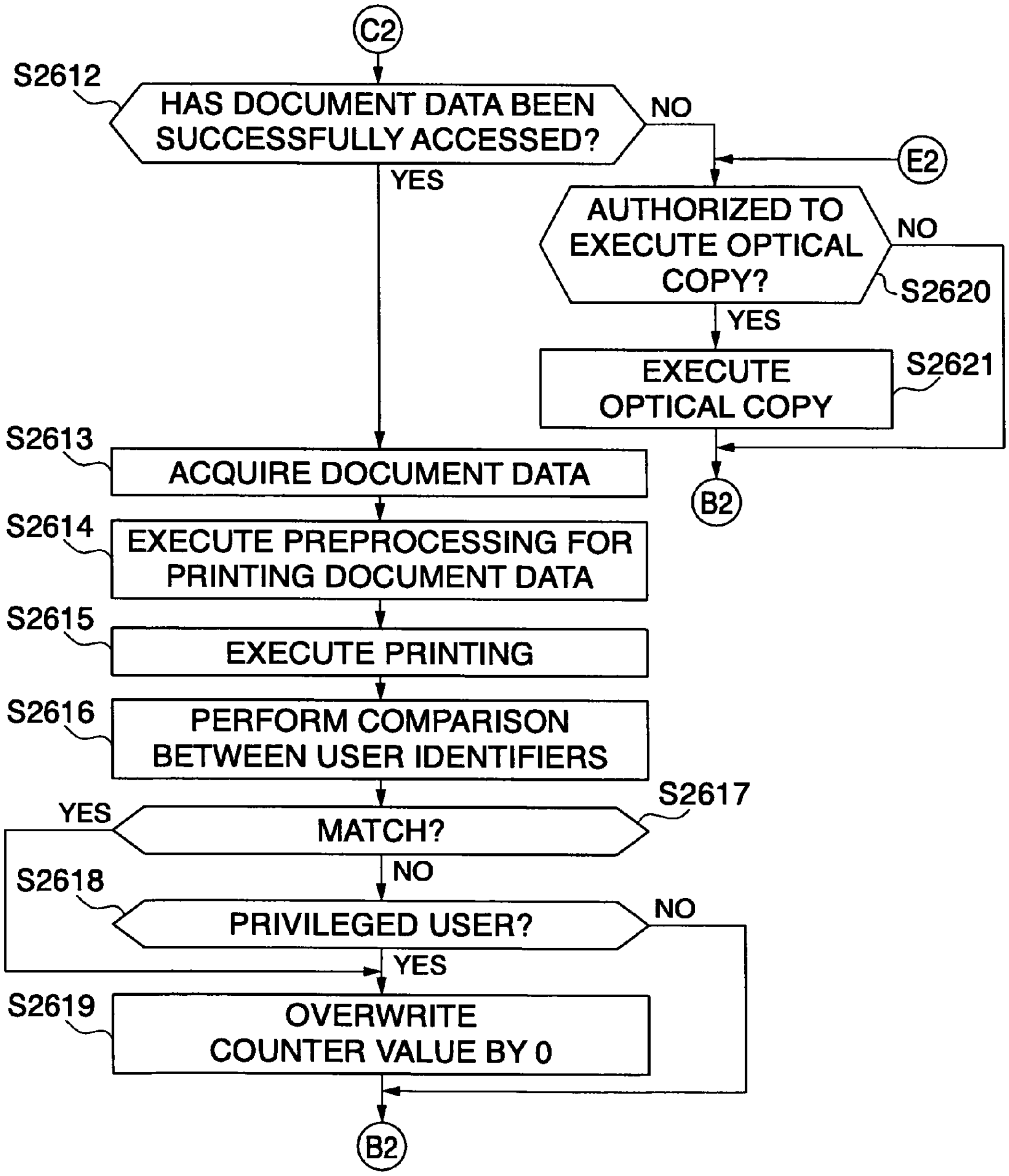
FIG. 28 is a continued part of the flowchart in FIG. 27.
Figure 29:
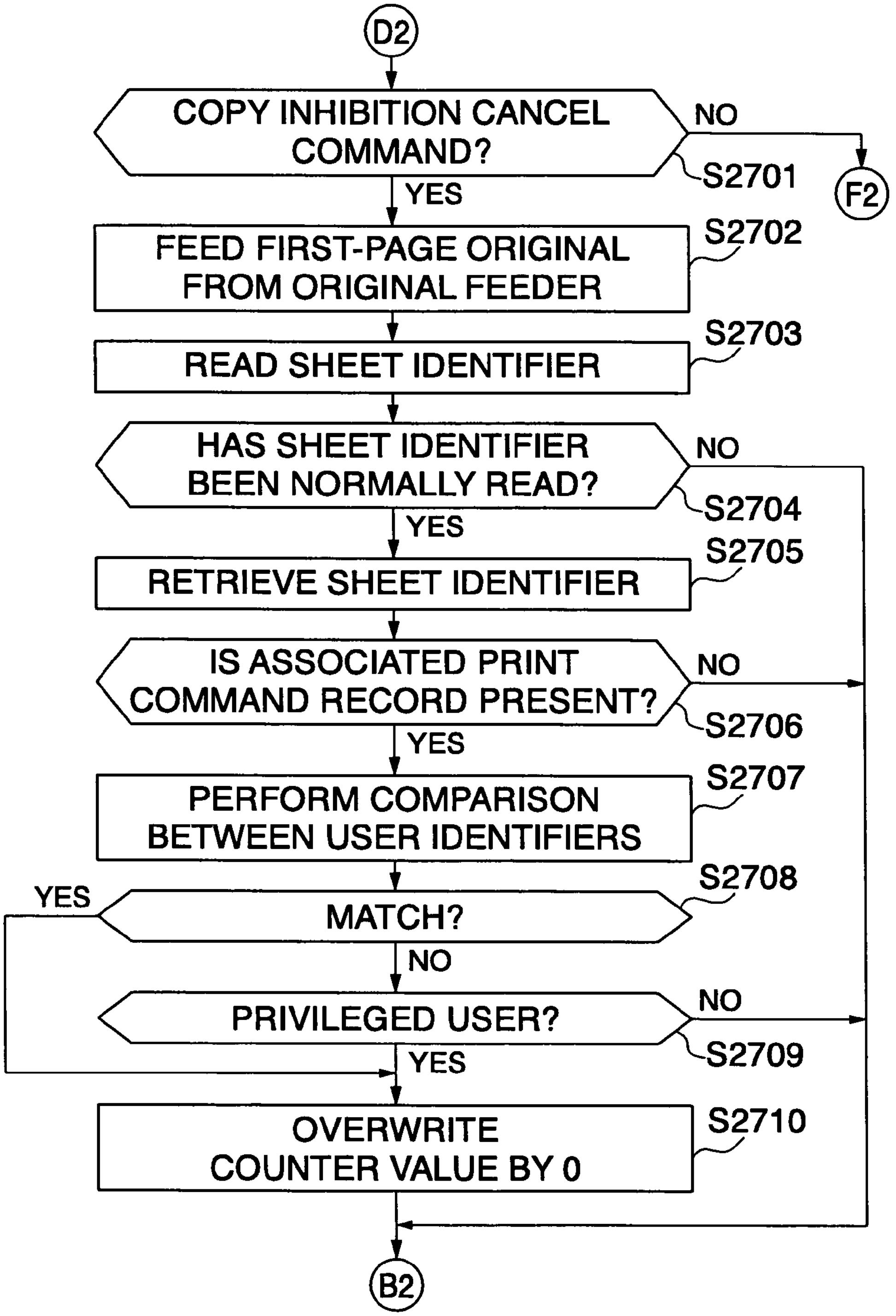
FIG. 29 is a continued part of the flowchart in FIG. 27.

As is distinct from the image forming process according to the fifth embodiment, in which the i-copy validity period of document data is managed using the downcounter, in the image forming process according to the sixth embodiment, an upcounter is used for the management. More specifically, in the image forming process according to the sixth embodiment, the initial value of the counter value 1805 in the print command record data 1801 is set to "0", and starting with the initial value "0", the timer value is incremented by "1" whenever the timer interrupt process shown in FIG. 26 occurs (step S2504).

A flowchart in FIGS. 25 to 31 shows the image forming process according to the sixth embodiment. The present image forming process is almost the same as the image forming process according to the fifth embodiment, and therefore a description will be briefly given of only different points.

A print command-related process (FIG. 25) of the present process is exactly the same as that in the image forming process according to the fifth embodiment (see FIG. 17). Further, a timer interrupt process (FIG. 26) in the present process is distinguished from that in the image forming process according to the fifth embodiment (see FIG. 19) only in that the counter value 1805 is incremented as described above.

In a copy command-related process (FIG. 27) of the present process, as is distinct from the image forming process according to the fifth embodiment (see step S2007 in FIG. 20), it is determined in a step S2607 whether or not the counter value 1805 in print command record data associated with the read sheet identifier 1802 is smaller than a predetermined value (counter value corresponding to the i-copy validity period) to thereby determine whether the i-copy validity period of document data associated with the sheet identifier 1802 has expired.

Further, in a validity period resetting process (FIG. 28) of the present process, as is distinct from the image forming process according to the fifth embodiment (see step S2019 in FIG. 21), the counter value 1805 in the print command record data associated with the read sheet identifier 1802 is overwritten by "0" in a step S2619.

Figure 30:
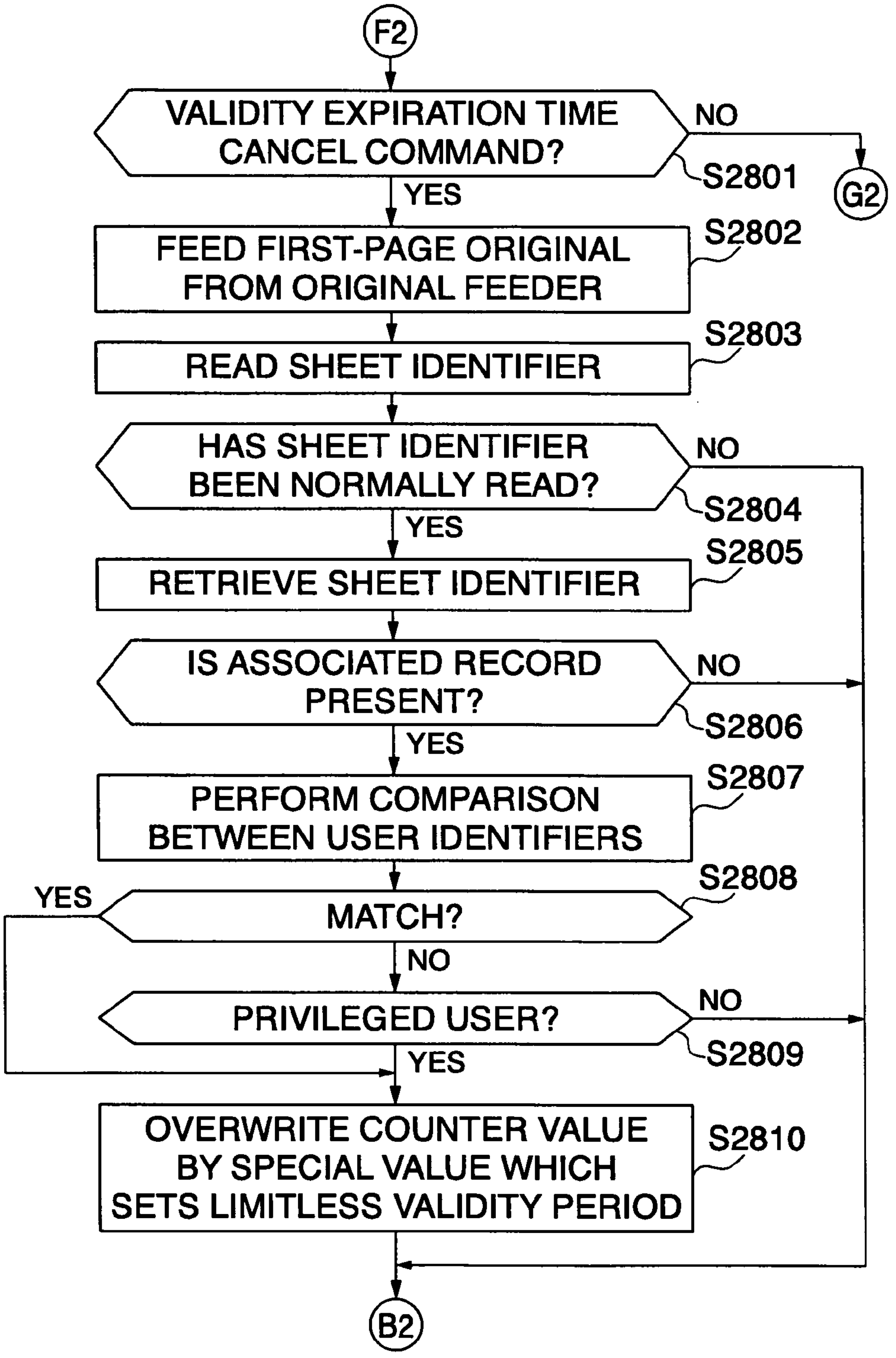
FIG. 30 is a continued part of the flowchart in FIG. 29.
Figure 31:
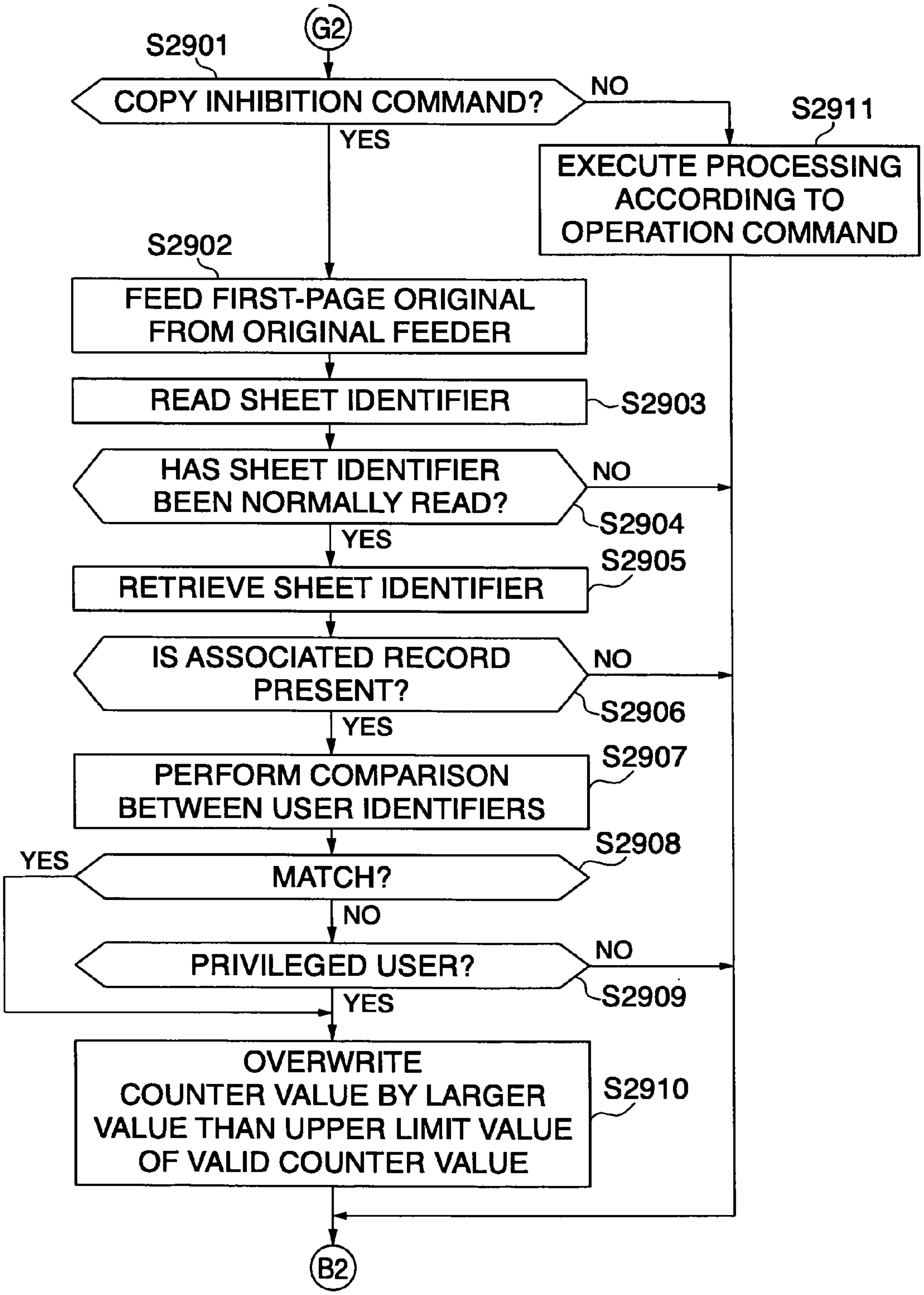
FIG. 31 is a continued part of the flowchart in FIG. 30.

Furthermore, in a copy inhibition canceling process (FIG. 29) of the present process, as is distinct from the image forming process according to the fifth embodiment (see step S2110 in FIG. 22), in the present process, the counter value 1805 in the print command record data associated with the read sheet identifier 1802 is overwritten by "0" in a step S2710. As shown in FIG. 30, a validity expiration time canceling process in the present process is exactly the same as that in the image forming process according to the fifth embodiment (see FIG. 23).

In a copy inhibiting process (FIG. 31) of the present process, as is distinct from the image forming process according to the fifth embodiment (see step S2310 in FIG. 24), the counter value 1805 in the print command record data associated with the read sheet identifier 1802 is overwritten by the predetermined value, i.e. the value larger than the counter value 1805 corresponding to the validity period, in a step S2910.

As described above, according to the image forming process according to the sixth embodiment, it is possible to manage the i-copy validity period of document data using the upcounter in place of the print command acceptance time 704 or the downcounter.

Next, a description will be given of an image forming process according to a seventh embodiment of the present invention. This image forming process is executed by the MFP 200.

The image forming process according to the seventh embodiment is similar to the image forming process according to the fourth embodiment in that when a print command is executed, the GUID generated in the MFP 200 is written into the RFID tag on a print sheet, and at the same time, the associated print command record data is stored in the server apparatus. However, as is distinct from the image forming process according to the fourth embodiment, in the present image forming process, not only when printing in response to the print command is executed, but also whenever the sheet (original) subjected to printing in response to the print command is set on the original feeder and processing in response to any one of the copy command, the copy inhibition cancel command, the validity expiration time cancel command, and the copy inhibition command is executed, the GUID is generated and additionally written into the RFID tag on the sheet, and at the same time, all the associated print command record data are additionally stored in the server apparatus.

Next, a description will be given of the image forming process according to the seventh embodiment with reference to FIGS. 32 to 36B. However, a print command-related process of the image forming process according to the seventh embodiment is exactly the same as the print command-related process in FIG. 16 executed in the image forming process according to the fourth embodiment, and therefore duplicate description thereof is omitted but reference should be made to FIG. 16 instead.

In FIG. 32, in a copy command-related process of the image forming process according to the seventh embodiment (step S3001), the CPU 301 causes the original feeder to feed a first-page original therefrom (step S3002), and instructs the RFID reader and writer 412 to read the sheet identifier 1802 from the RFID tag attached to the original (step S3003). In the step S3003, a photoelectric conversion device may replace the RFID reader and writer 412 to read the sheet identifier 1802 printed on the original in the form of a bar code or the like. Further, the RFID tag sometimes has a plurality of sheet identifiers 1802 written therein, and in such a case, the RFID reader and writer 412 reads all the sheet identifiers 1802.

Figure 33:
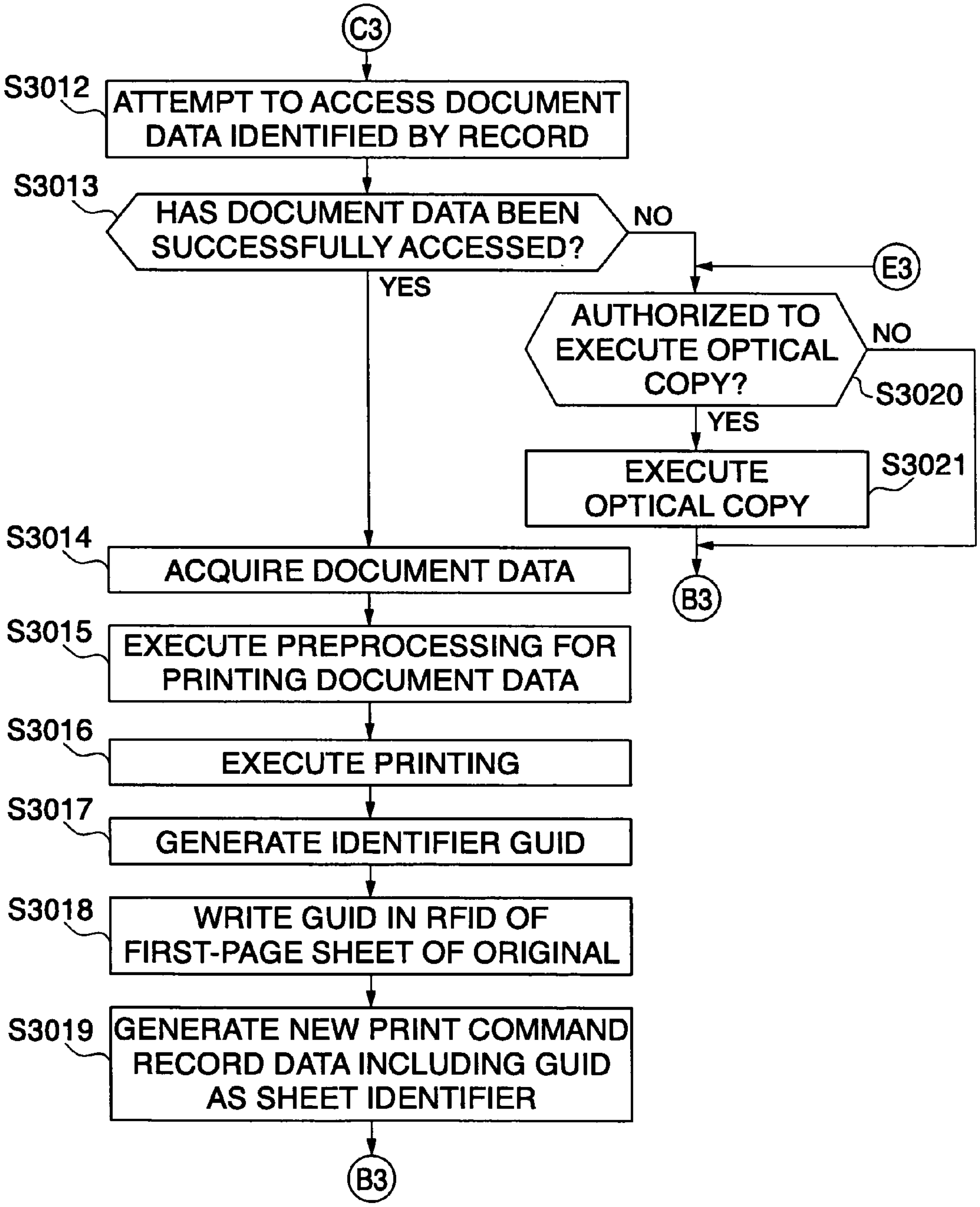
FIG. 33 is a continued part of the flowchart in FIG. 32.

If the sheet identifier 1802 has not been normally read (NO to a step S3004), the CPU 301 determines whether or not the user who has been successfully authenticated in the step S1602 is authorized to perform optical copy (step S3020 in FIG. 33). If it is determined that the user is authorized to perform optical copy (YES to the step S3020), the CPU 301 causes normal optical copy processing to be executed (step S3021), and the process returns to the step S1614, wherein the successful user authentication is invalidated.

If one or more sheet identifiers 1802 have been normally read (YES to the step S3004), the CPU 301 inquires of the server apparatus whether or not there is/are an entry/entries of the sheet identifier/identifiers 1802 in the print command record data list 1810 (step S3005). In this case, if there is/are an entry/entries of the inquired sheet identifier/identifiers 1802 in the print command record data list 1810, one record or a plurality of records (print command record data) associated with the sheet identifier or respective sheet identifiers 1802 are sent from the server apparatus to the CPU 301 of the MFP 200 which has made the inquiry, whereas if there are no entries of the sheet identifiers 1802, the server apparatus sends an error message to that effect to the CPU 301 of the MFP 200.

When the CPU 301 receives the message to the effect that there are no entries of the sheet identifiers 1802 (NO to a step S3006), the process proceeds to the step S3020, wherein the CPU 301 determines whether or not the user is authorized to perform optical copy. On the other hand, when the sheet identifier/identifiers 1802 has/have been entered, and therefore the CPU 301 receives the record/records associated with the sheet identifier or respective sheet identifiers 1802 (YES to the step S3006), the CPU 301 determines whether or not the user who has been successfully authenticated is a privileged user (step S3007). If the user is a privileged user, the process proceeds to a step S3012, referred to hereinafter, whereas if the user is not a privileged user, the CPU 301 performs comparison between the user identifier of the user who has been successfully authenticated and a user identifier 1803 in the record or each of the records (print command record data) acquired from the server apparatus in the step S3005 (step S3008), and if there is a user identifier 1803 that matches the user identifier of the user who has been successfully authenticated (YES to 3009), the process proceeds to the step S3012.

On the other hand, if there is no user identifier 1803 that matches the user identifier of the user who has been successfully authenticated, the CPU 301 determines whether or not the acceptance time of the record or the newest one of the records (print command record data) acquired from the server apparatus in the step S3005 is within the validity period (steps S3010 and S3011). If the acceptance time is not within the validity period, the process proceeds to the step S3020, wherein the CPU 301 determines whether or not the user is authorized to perform optical copy. On the other hand, if the acceptance time is within the validity period, the process proceeds to the step S3012.

In the step S3012, the CPU 301 attempts to access document data identified by the document data identifier 1804 in the record or records acquired from the server apparatus in the step S3005. The CPU 301 makes this attempt by sending an inquiry command including the document data identifier 1804 to the server apparatus. Even when a plurality of records are acquired from the server apparatus in the step S3005, the document data identifiers of these print command record data are the same.

When the CPU 301 has failed in accessing the document data (NO to a step S3013), the process proceeds to the step S3020, wherein the CPU 301 determines whether or not the user is authorized to perform normal optical copy. On the other hand, when the CPU 301 has successful in accessing the document data (YES to the step S3013), the CPU 301 actually acquires the document data (step S3014), executes predetermined preprocessing for printing the document data (step S3015), and carries out i-copy (step S3016).

Next, the CPU 301 generates an identifier GUID to be used as the sheet identifier 1802 (step S3017) and writes the generated GUID into the RFID tag attached to the first page of the original (step S3018).

Then, the CPU 301 newly generates print command record data comprised of the data items of the sheet identifier written in the original, the user identifier 1803 of the user who has been successfully authenticated, the acceptance time of the copy command, and the document data identifier 1804 of the document data for i-copy, and sends the print command record data to the server apparatus (step S3019). Thereafter, the process proceeds to the step S1614, wherein the successful user authentication is invalidated.

In writing the GUID generated in the step S3017 into the RFID tag on the print sheet in the step S3018, if the RFID tag already has another GUID written therein, the newly generated GUID may be additionally written, leaving the former GUID undeleted if necessary, or may be written over the former GUID. Further, in storing the newly generated print command record data, the print command record data associated with the former GUID may be left undeleted, or overwritten thereby.

However, if the former GUID and associated print command record data are left undeleted on the RFID tag attached to a print sheet, it is possible to authorize numerous users to execute i-copy, i-copy inhibition cancellation, i-copy validity expiration time cancellation, i-copy inhibition, and the like processing for document data printed on the print sheet. Therefore, in the present image forming process, the former GUID and associated print command record data are left undeleted on the RFID tag.

Thus, according to the present embodiment, as in the first embodiment, the user who has been successful in the user authentication is allowed to perform i-copy at any time within the i-copy validity period, even if the user is not the user who caused the MFP 200 to print the document data for i-copy in the step S1612, or a privileged user.

Further, as in the first embodiment, the user who caused the MFP 200 to print the document data for i-copy in the step S1612 or a privileged user is allowed to perform i-copy at any time, regardless of the i-copy validity period, and to extend the i-copy validity period whenever i-copy is carried out.

Figure 34:
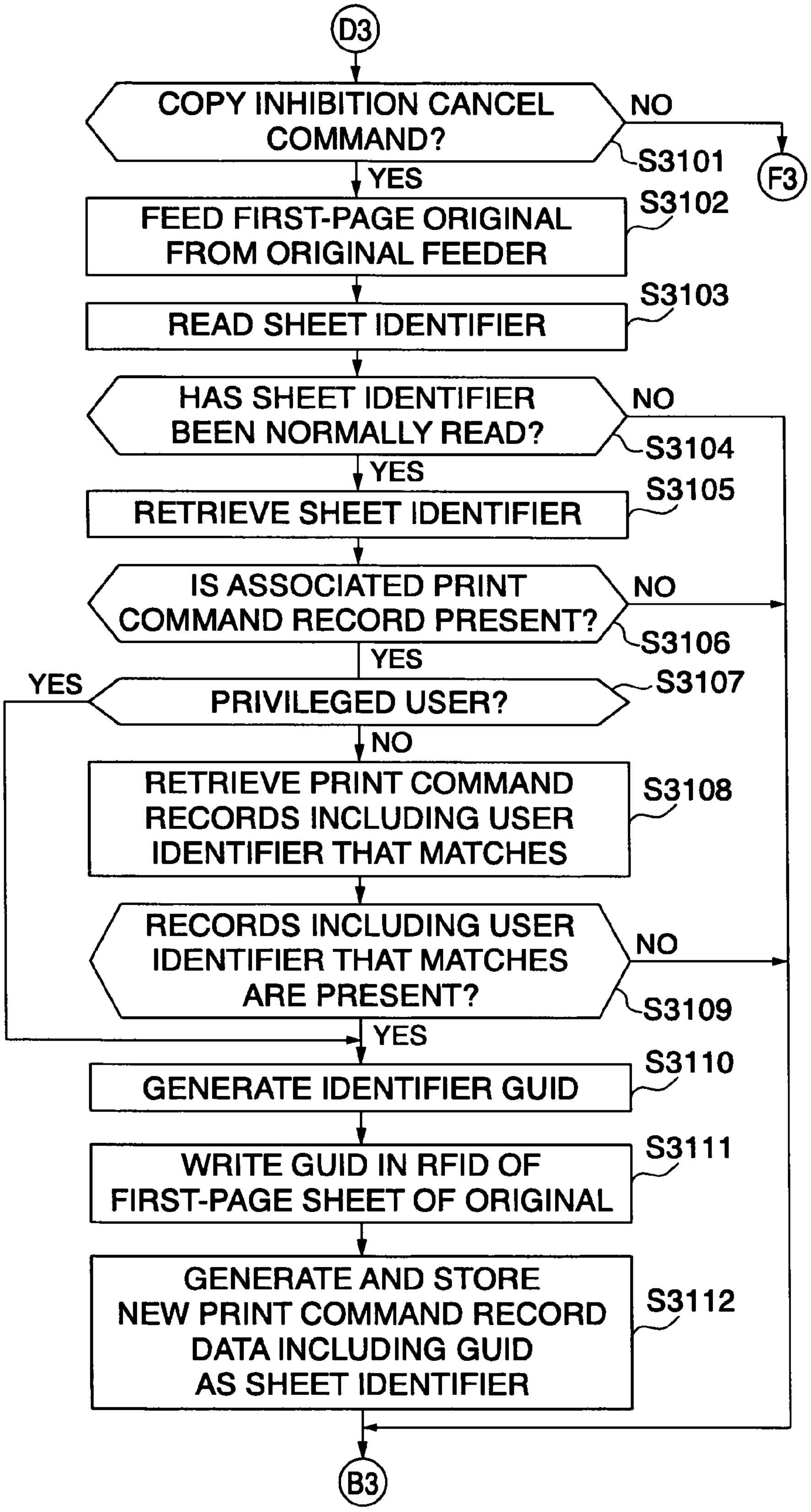
FIG. 34 is a continued part of the flowchart in FIG. 32.

FIG. 34 is a flowchart of a copy inhibition canceling process following the step S3001 in FIG. 32.

In the copy inhibition canceling process in FIG. 34, when the user who caused the MFP 200 to print the document data associated with the sheet identifier 1802 read from the original in the step S1612 or a privileged user has issued a copy inhibition cancel command (steps S3101 to S3109), the CPU 301 generates a GUID to be used as the sheet identifier 1802 (step S3110), and writes the GUID into the RFID tag attached to the first page of the original (step S3111).

Then, the CPU 301 newly generates print command record data comprised of the data items of the sheet identifier 1802 written into the original, the user identifier 1803 of the currently authenticated user, the acceptance time of the copy command, and the document data identifier 1804 of the document data for i-copy, and sends the generated print command record data to the server apparatus (step S3112), and the process proceeds to the step S1614, wherein the successful user authentication is invalidated.

Figure 35:
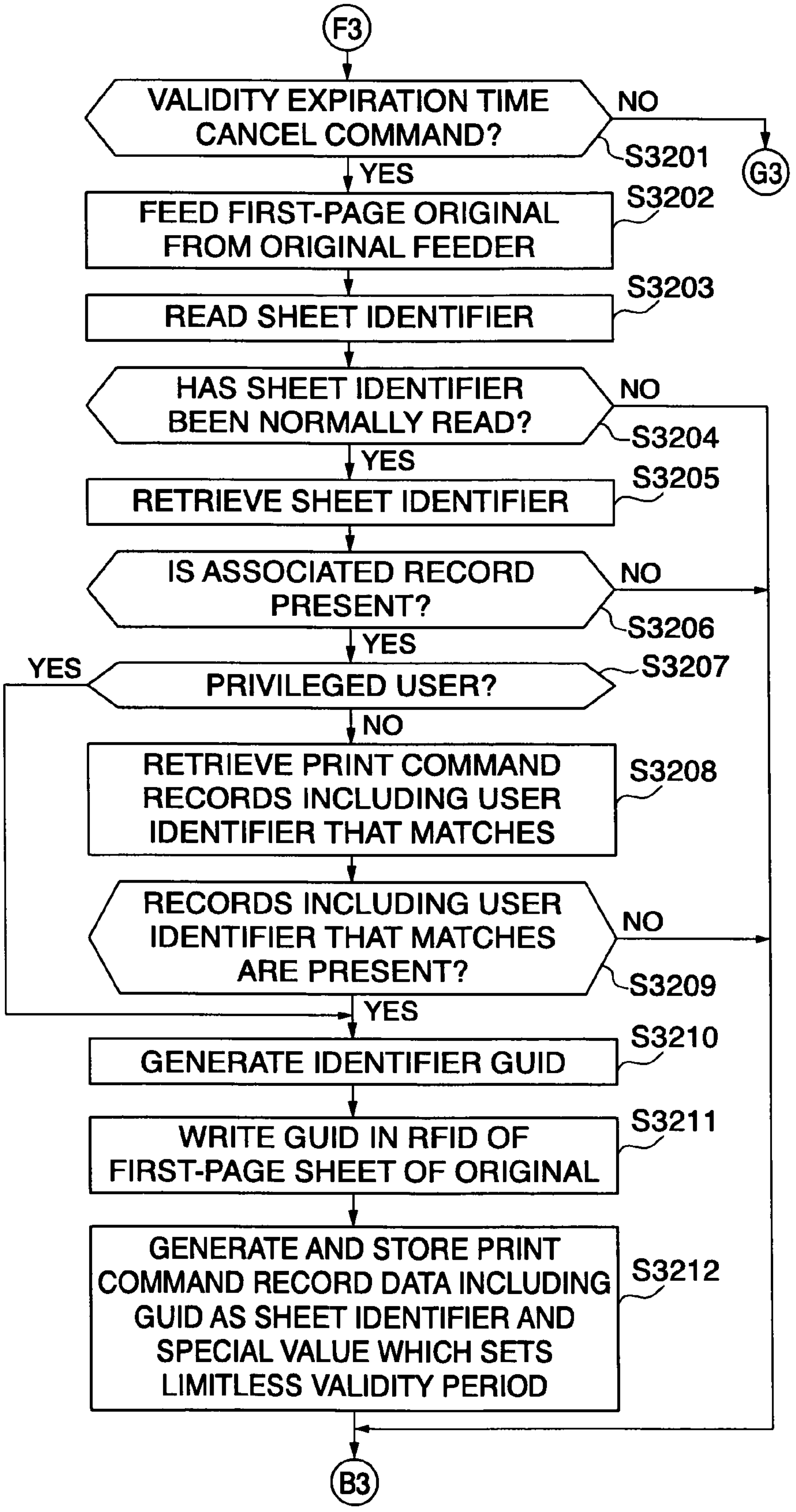
FIG. 35 is a continued part of the flowchart in FIG. 34.

FIG. 35 is a flowchart of a validity expiration time canceling process following the step S3101 in FIG. 34.

In the validity expiration time canceling process in FIG. 35, when the user who caused the MFP 200 to print, in the step S1612, the document data associated with the sheet identifier 1802 read from the original or a privileged user has issued a validity expiration time cancel command (steps S3201 to S3209), the CPU 301 generates a GUID to be used as the sheet identifier 1802 (step S3210), and writes the GUID into the RFID tag attached to the first page of the original (step S3211). Then, the CPU 301 newly generates print command record data comprised of the data items of the sheet identifier 1802 written into the original, the user identifier 1803 of the user who has been successfully authenticated, data indicative of a limitless validity period, and the document data identifier 1804 of the document data, and sends the generated print command record data to the server apparatus (step S3212), and the process proceeds to the step S1614, wherein the successful user authentication is invalidated.

Figure 36A:
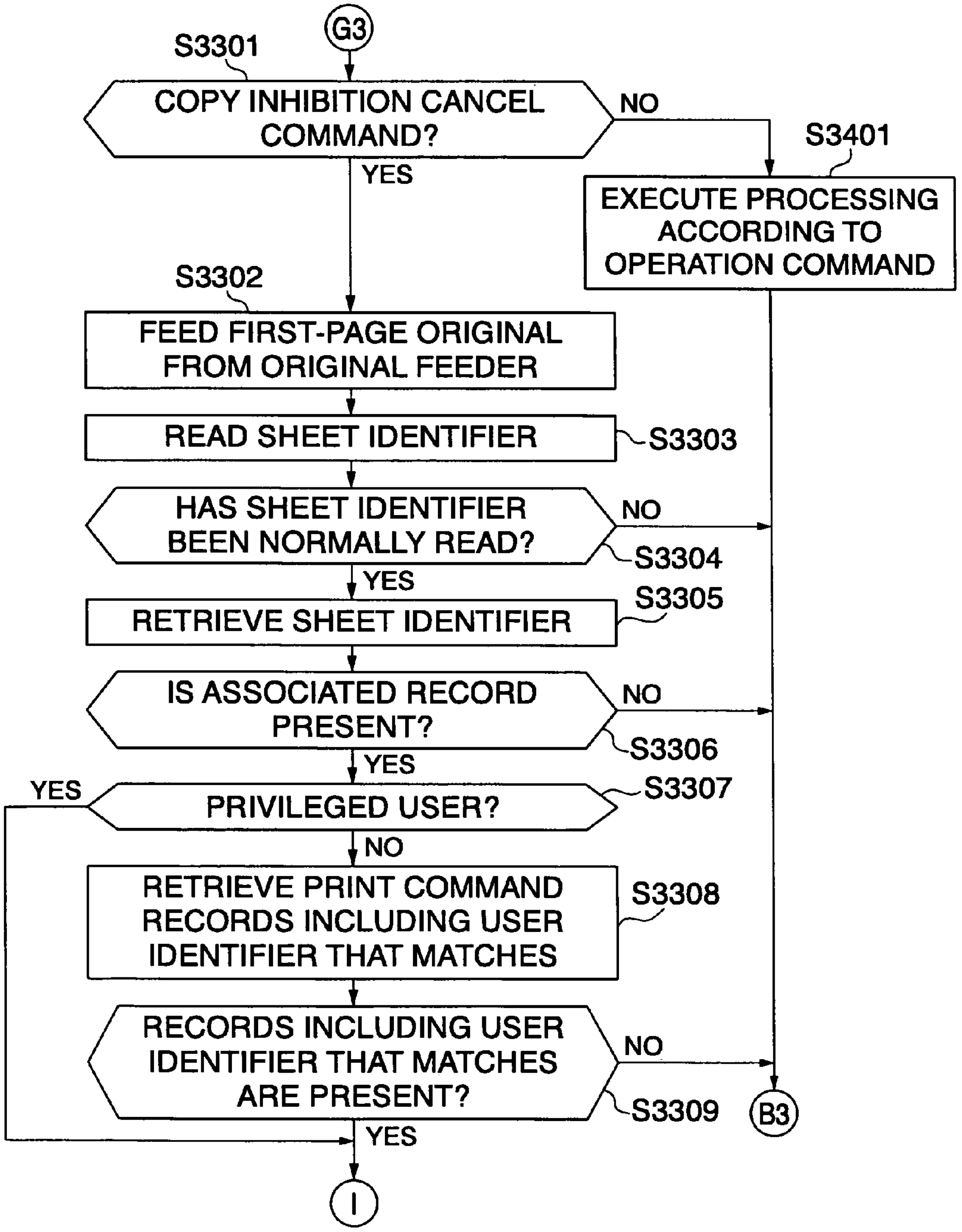
FIGS. 36A and 36B are continued part of the flowchart in FIG. 35.
Figure 36B:
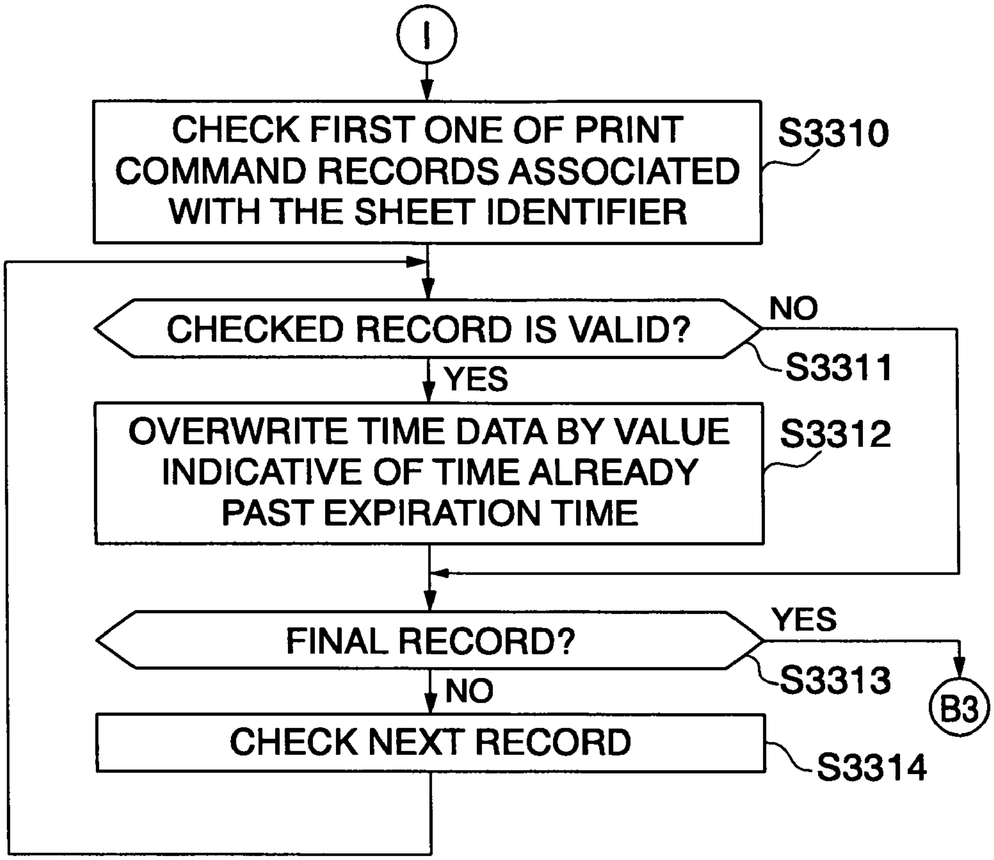

FIGS. 36A and 36B are flowchart of a copy inhibiting process following the step S3201 in FIG. 35.

In the copy inhibiting process in FIGS. 36A and 36B, when the user who caused the MFP 200 to print the document data associated with the sheet identifier 1802 read from the original in the step S1612, or a privileged user has issued a copy inhibition command (steps S3301 to S3309), the CPU 301 overwrites a print command acceptance time in each of records (print command record data) associated with the sheet identifier 1802 by a time already past the associated validity expiration time, and sends all the records to the server apparatus (steps S3310 to S3314). Then, the process proceeds to the step S1614, wherein the successful user authentication is invalidated.

In this way, the seventh embodiment allows numerous users to execute the process for i-copying the same document data file or changing the i-copy validity period of the document data.

The present invention is not limited to the above-described embodiments. For example, in the image forming process according to the seventh embodiment, it is possible to write a plurality of GUIDs in the RFID tag on a print sheet, as well as to write the GUIDs and the associated user identifiers into the sheet identifier field 1802 and the user identifier field 1803 of the first record (print command record data) instead of sequentially adding records, to thereby minimize the memory capacity.

Further, in each of the image forming processes according to the first to seventh embodiments, all or part of the processes, particularly those related to the copy inhibition cancel command, the validity expiration time cancel command, and the copy inhibition command, can be executed by an information processing apparatus. Moreover, it is possible to combine the image forming processes according to the first to seventh embodiments as appropriate.

It is to be understood that the object of the present invention may also be accomplished by supplying a system or an apparatus with a storage medium (or a recording medium) in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and a storage medium on which the program code is stored constitute the present invention.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of the above-mentioned embodiment on a computer, and the form of the program may be an object code, a program executed by an interpreter, or script data supplied to an OS.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program is supplied by downloading from another computer, a database, or the like, not shown, connected to the Internet, a commercial network, a local area network, or the like.

CROSS REFERENCE TO RELATED APPLICATION

This application claims priority from Japanese Patent Application No. 2003-392379 filed Nov. 21, 2003, which is hereby incorporated by reference herein.

What is claimed is:

1. An image forming system comprising:

a storage unit that stores document data once having been printed, in association with a sheet identifier recorded on a print sheet on which the document data has been printed;

an authentication unit that authenticates a user based on an entered user identifier;

an operating unit that accepts an operation command issued by a user;

a reading unit that reads the sheet identifier from the print sheet when the operating unit has accepted a copy command issued by the user authenticated by said authentication unit;

a printing unit that reads out the document data associated with the sheet identifier read by said reading unit, from said storage unit, and prints the document data; and an inhibition unit operable when the sheet identifier has not been read from the print sheet based on the accepted copy command over a predetermined time period, to inhibit the document data associated with the sheet identifier from being printed by said printing unit, wherein when the user, who has been authenticated by said authentication unit and has issued the copy command via said operating section, also has instructed the printing unit to print the document data on the print sheet having recorded thereon the sheet identifier read by said reading unit when the copy command is issued, said inhibition unit allows the document data associated with the sheet identifier to be printed by said printing unit, wherein said storage unit stores an immediately preceding printing time and the document data in association with the sheet identifier, and wherein said inhibition unit comprises a determination unit that determines whether or not the sheet identifier has not been read from the print sheet over the predetermined time period, based on a present time and the immediately preceding printing time stored in said storage unit.

2. An image forming system as claimed in claim 1, wherein when the user who has been authenticated by said authentication unit is also a privileged user, said inhibition unit allows the document data associated with the sheet identifier to be printed by said printing unit without inhibiting printing of the document data, even if the sheet identifier has not been read from the print sheet based on the copy command over the predetermined time period.

3. An image forming system as claimed in claim 1, wherein the sheet identifier has been recorded in advance on the print sheet.

4. An image forming system as claimed in claim 1, wherein the sheet identifier is generated and recorded on the print sheet when the document data to be stored in said storage unit is printed.

5. An image forming system as claimed in claim 3, wherein the sheet identifier has been recorded in advance on a non-contact IC attached to the print sheet.

6. An image forming system as claimed in claim 4, wherein the sheet identifier generated when the document data to be stored in said storage unit is printed is recorded in a non-contact IC attached to the print sheet.

7. An image forming system as claimed in claim 1, further comprising a rewriting unit operable, when the user, who has been authenticated by said authentication unit and has issued the copy command via said operating section, also caused the document data associated with the sheet identifier read by said reading unit to be printed, or is also a privileged user, to overwrite the immediately preceding printing time stored in said storage unit by a present printing time whenever the document data associated with the sheet identifier read by said reading unit is read out from said storage unit and printed by said printing unit.

8. An image forming system as claimed in claim 1, further comprising a changing unit operable, when the user, who caused the document data associated with the sheet identifier read by said reading unit to be printed or is a privileged user having been authenticated by said authentication unit, and has issued a predetermined change command, to change the immediately preceding printing time stored in said storage unit in association with the document data, according to the predetermined change command.

9. An image forming system as claimed in claim 1, further comprising a downcounter that downcounts a count at predetermined time intervals, and wherein said storage unit stores the count of the downcounter in association with the sheet identifier and the document data, and said determination unit also determines whether or not the sheet identifier has not been read from the print sheet over the predetermined time period, based on the count of said downcounter.

10. An image forming system as claimed in claim 9, further comprising a resetting unit operable when the user, who has been authenticated by said authentication unit and has issued the copy command via said operating section, also caused the document data associated with the sheet identifier read by said reading unit to be printed, or is a privileged user, to reset the count of said downcounter stored in said storage unit to a predetermined initial value whenever the document data associated with the sheet identifier read by said reading unit is read out from said storage unit and printed by said printing unit.

11. An image forming system as claimed in claim 9, further comprising a changing unit operable when the user, who caused the document data associated with the sheet identifier read by said reading unit to be printed or is a privileged user having been authenticated by said authentication unit, and has issued a predetermined change command, to change the count of the downcounter stored in said storage unit in association with the document data, according to the predetermined change command.

12. An image forming system as claimed in claim 1, further comprising an upcounter that upcounts a count at predetermined time intervals, and wherein said storage unit stores the count of the upcounter in association with the sheet identifier and the document data, and said determination unit also determines, based on the count of the upcounter, whether or not the sheet identifier has not been read from the print sheet over a predetermined time period.

13. An image forming system as claimed in claim 12, further comprising a resetting unit operable, when the user, who has been authenticated by said authentication unit and has issued the copy command via said operating section, also caused the document data associated with the sheet identifier read by said reading unit to be printed, or is also a privileged user, to reset the count of the upcounter stored in said storage unit to a predetermined initial value whenever the document data associated with the sheet identifier read by said reading unit is read out from said storage unit and printed by said printing unit.

14. An image forming system as claimed in claim 12, further comprising a changing unit operable, when the user, who caused the document data associated with the sheet identifier read by said reading unit to be printed or is a privileged user having been authenticated by said authentication unit, and has issued a predetermined change command, to change the count of the upcounter stored in said storage unit in association with the document data, according to the predetermined change command.

15. An image forming system as claimed in claim 1, further comprising:

a generation unit that generates the sheet identifier whenever document data to be stored or having been stored is printed on a print sheet;

a recording unit that records the sheet identifiers generated by said generation unit, one by one, on the print sheet; and a registration unit that generates records each including the sheet identifier generated by said generation unit and an identifier of the document data, one by one, and registers the generated records anew in said storage unit.

16. An image forming apparatus capable of accessing a server apparatus that stores and distributes document data once having been printed, in association with a sheet identifier recorded on a print sheet on which the document data has been printed, comprising:

an authentication unit that authenticates a user based on an entered user identifier;

an operating unit that accepts an operation command issued by a user;

a reading unit that reads the sheet identifier from the print sheet when the operating unit has accepted a copy command issued by the user authenticated by said authentication unit;

a printing unit that reads out the document data associated with the sheet identifier read by said reading unit, from the server apparatus, and prints the document data; and an inhibition unit operable when the sheet identifier has not been read from the print sheet based on the accepted copy command over a predetermined time period, to inhibit the document data associated with the sheet identifier from being printed by said printing unit, wherein when the user, who has been authenticated by said authentication unit and has issued the copy command via said operating section, also has instructed the printing unit to print the document data on the print sheet having recorded thereon the sheet identifier read by said reading unit when the copy command is issued, said inhibition unit allows the document data associated with the sheet identifier to be printed by said printing unit, wherein said server apparatus stores an immediately preceding printing time and the document data in association with the sheet identifier, and wherein said inhibition unit comprises a determination unit that determines whether or not the sheet identifier has not been read from the print sheet over the predetermined time period, based on a present time and the immediately preceding printing time stored in said server apparatus.

17. A method of controlling an image forming system, comprising:

a storage step of storing in a storage unit document data once having been printed, in association with a sheet identifier recorded on a print sheet on which the document data has been printed;

an authentication step of authenticating a user based on an entered user identifier;

an operating step of accepting an operation command issued by a user;

a reading step of reading the sheet identifier from the print sheet when the operating step has accepted a copy command issued by the user authenticated in said authentication step;

a printing step of reading out the document data associated with the sheet identifier read in said reading step, from document data stored in said storage step, and printing the document data read out; and an inhibition step of inhibiting the document data associated with the sheet identifier from being printed in said printing step, when the sheet identifier has not been read from the print sheet based on the accepted copy command over a predetermined time period, wherein when the user, who has been authenticated in said authentication step and has issued the copy command in said operating step, also has instructed to print the document data on the print sheet having recorded thereon the sheet identifier read in said reading step when the copy command is issued, said inhibition step allows the document data associated with the sheet identifier to be printed in said printing step, wherein said storage step stores in said storage unit an immediately preceding printing time and the document data in association with the sheet identifier, and wherein said inhibition step includes a determination step of determining whether or not the sheet identifier has not been read from the print sheet over the predetermined time period, based on a present time and the immediately preceding printing time stored in said storage unit.

18. A method of controlling an image forming apparatus capable of accessing a server apparatus that stores and distributes document data once having been printed, in association with a sheet identifier recorded on a print sheet on which the document data has been printed, comprising:

an authentication step of authenticating a user based on an entered user identifier;

an operating step of accepting an operation command issued by a user;

a reading step of reading the sheet identifier from the print sheet when the operating step has accepted a copy command issued by the user authenticated in said authentication step;

a printing step of reading out the document data associated with the sheet identifier read in said reading step, from the server apparatus, and printing the document data; and an inhibition step of inhibiting the document data associated with the sheet identifier from being printed in said printing step, when the sheet identifier has not been read from the print sheet based on the accepted copy command over a predetermined time period, wherein when the user, who has been authenticated in said authentication step and has issued the copy command in said operating step, also has instructed to print the document data on the print sheet having recorded thereon the sheet identifier read in said reading step when the copy command is issued, said inhibition step allows the document data associated with the sheet identifier to be printed in said printing step, wherein said server apparatus stores an immediately preceding printing time and the document data in association with the sheet identifier, and wherein said inhibition step includes a determination step of determining whether or not the sheet identifier has not been read from the print sheet over the predetermined time period, based on a present time and the immediately preceding printing time stored in said server apparatus.

19. A computer storage medium storing a computer program for controlling an image forming apparatus capable of accessing a server apparatus that stores and distributes document data once having been printed, in association with a sheet identifier recorded on a print sheet on which the document data has been printed, the computer program comprising;

an authentication module for authenticating a user based on an entered user identifier;

an operating module for accepting an operating command issued by a user;

a reading module for reading the sheet identifier from the print sheet when the operating module has accepted a copy command issued by the user authenticated by said authentication module;

a printing module for reading out the document data associated with the sheet identifier read by said reading module, from the server apparatus, and printing the document data; and an inhibition module for inhibiting the document data associated with the sheet identifier from being printed by said printing module, when the sheet identifier has not been read from the print sheet based on the accepted copy command over a predetermined time period, wherein when the user, who has been authenticated by said authentication module and has issued the copy command via said operating module, also has instructed to print the document data on the print sheet having recorded thereon the sheet identifier read by said reading module when the copy command is issued, said inhibition module allows the document data associated with the sheet identifier to be printed in said printing module, wherein said server apparatus stores an immediately preceding printing time and the document data in association with the sheet identifier, and wherein said inhibition module includes a determination module for determining whether or not the sheet identifier has not been read from the print sheet over the predetermined time period, based on a present time and the immediately preceding printing time stored in said sewer apparatus.

* * * * *